United States Patent
Yilbas et al.

(10) Patent No.: US 9,981,340 B2
(45) Date of Patent: May 29, 2018

(54) LASER ABLATION METHOD FOR TREATING A COPPER ALLOY CONTAINING METALLIC SURFACE AND INCREASING HYDROPHOBICITY

(71) Applicant: KING FAHD UNIVERSITY OF PETROLEUM AND MINERALS, Dhahran (SA)

(72) Inventors: Bekir Sami Yilbas, Dhahran (SA); Haider Ali, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 99 days.

(21) Appl. No.: 15/085,605

(22) Filed: Mar. 30, 2016

(65) Prior Publication Data

US 2017/0014946 A1 Jan. 19, 2017

Related U.S. Application Data

(60) Provisional application No. 62/191,879, filed on Jul. 13, 2015.

(51) Int. Cl.
| | |
|---|---|
| *C23C 14/28* | (2006.01) |
| *B23K 26/00* | (2014.01) |
| *B23K 26/352* | (2014.01) |
| *C22C 9/02* | (2006.01) |
| *B23K 26/14* | (2014.01) |
| *B23K 26/082* | (2014.01) |
| *B23K 26/0622* | (2014.01) |
| *B23K 103/12* | (2006.01) |

(52) U.S. Cl.
CPC ...... *B23K 26/0078* (2013.01); *B23K 26/0093* (2013.01); *B23K 26/0624* (2015.10); *B23K 26/082* (2015.10); *B23K 26/14* (2013.01); *B23K 26/1476* (2013.01); *B23K 26/352* (2015.10); *C22C 9/02* (2013.01); *B23K 2203/12* (2013.01)

(58) Field of Classification Search
CPC .............................. C23C 16/483; C23C 14/28
See application file for complete search history.

(56) References Cited

U.S. PATENT DOCUMENTS

| | | | | |
|---|---|---|---|---|
| 4,890,294 A | * | 12/1989 | Nishimae | H01J 37/32192 372/57 |
| 4,904,498 A | * | 2/1990 | Wu | B23K 26/18 205/196 |
| 2009/0166640 A1 | * | 7/2009 | Han | H01L 21/32051 257/72 |
| 2011/0008973 A1 | * | 1/2011 | Kawaguchi | B23K 26/0608 438/795 |
| 2014/0161988 A1 | * | 6/2014 | Yilbas | C23C 8/62 427/554 |
| 2014/0314995 A1 | | 10/2014 | Liu et al. | |
| 2015/0093516 A1 | * | 4/2015 | Araga | B05C 9/12 427/542 |
| 2016/0005992 A1 | * | 1/2016 | Song, II | H01L 51/5275 257/40 |

FOREIGN PATENT DOCUMENTS

JP 2015182923 * 10/2015

OTHER PUBLICATIONS

Zhou, Qi, et al., "Determination of ablation threshold of copper alloy with orthogonal dual-pulse laser-ablation laser-induced breakdown spectroscopy". Applied Optics, vol. 52, No. 23, Aug. 10, 2013, pp. 5600-5605.*
Sukhov, I.A., et al., "Generation of nanoparticles of bronze and brass by laser ablation in liquid". Applied Surface Science, 302 (2014) 79-82.*
Babushok, V.I., et al., "Double pulse laser ablation and plasma: Laser inducted breakdown spectroscopy signal enhancement". Spectrochimica Acta Part B 61 (2006) 999-1014.*
Yilbas, B.S., "Laser Ablation of Phosphor Bronze for Superhydrophobic Surface", Surface Engineering, 8 Pages total, (Feb. 23, 2016).

* cited by examiner

*Primary Examiner* — Bret P Chen
(74) *Attorney, Agent, or Firm* — Oblon, McClelland, Maier & Neustadt, L.L.P.

(57) ABSTRACT

A method of treating a metallic surface comprising a copper alloy, such as phosphor bronze, whereby the metallic surface is ablated by directing a laser beam with a diameter of 200-400 μm produced by a $CO_2$ laser with a pulse frequency of 1200-1800 HZ onto the metallic surface, and a $N_2$ assist gas is concurrently applied with a pressure of 550-650 KPa co-axially with the laser beam to form an ablated metallic surface comprising microgrooves with $Cu_3N$ present on a surface of the microgrooves, wherein the ablated metallic surface has a higher surface hydrophobicity than the metallic surface prior to the ablating.

20 Claims, 9 Drawing Sheets

LASER ABLATION METHOD FOR TREATING A COPPER ALLOY CONTAINING METALLIC SURFACE AND INCREASING HYDROPHOBICITY

CROSS REFERENCE TO RELATED APPLICATIONS

This application claims the benefit of priority from U.S. Provisional Application No. 62/191,879 filed Jul. 13, 2015, the entire contents of which are herein incorporated by reference.

BACKGROUND OF THE INVENTION

Technical Field

The present disclosure relates to a method of treating a copper alloy containing metallic surface using laser ablation and application of a $N_2$ assist gas.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Phosphor bronze finds wide applications in industry due to its good formability, desirable resistance to corrosion in marine environments, and high electrical and thermal conductivities [Z. Han, Y. F. He, H. C. Lin and H. Zhao: 'Dealloying characterizations of Cu—Al alloy in marine environment', J. Mater. Sci. Lett., 2000, 19, (5), 393-395.—incorporated herein by reference in its entirety]. In general copper alloys have antimicrobial attributes and several bacteria, known to be human pathogens, die when they come in contact with dry copper and copper alloy surfaces at room temperature. It has been demonstrated that the amount of live bacteria dropped several orders of magnitude, to zero in 1-2 hr when they were in contact with a copper alloy surface [G. Grass, C. Rensing and M. Solioz: 'Metallic copper as an antimicrobial surface', Appl. Environ. Microbiol., 2011, 77, (5), 1541-1547.—incorporated herein by reference in its entirety]. However, the use of phosphor bronze in antibacterial environments requires special attention to improve the surface properties of the alloy prior to its application in such environments. In this case, improvement of the surface hydrophobicity of the alloy reduces the contact area of bacterial fluid and minimizes the stains left over after the dry out of the hazardous fluid at the surface. However, phosphor bronze surfaces are hydrophilic and it is hard to repel the infected fluids from the surface [N. J. Shirtcliffe, G. McHale, M. I. Newton and C. C. Perry: 'Wetting and wetting transitions on copper-based super-hydrophobic surfaces', Langmuir, 2005, 21, (3), 937-943.—incorporated herein by reference in its entirety]. The surface hydrophobicity can be improved significantly via texturing of the surface while forming nano/micro sized poles and cavities.

One of the methods to texture the bronze surface is the laser ablation of the alloy surface in a controlled environment. In addition, laser surface treatment improves tribological properties of the surface such as hardness, wear and corrosion resistance [B. S. Yilbas, I. Toor, J. Malik, F. Patel and C. Karatas: 'Electrochemical testing of laser treated bronze surface', J. Alloys Compd, 2013, 563, 180-185.; and B. S. Yilbas, S. Akhtar and C. Karatas: 'Laser nitriding of the surface of phosphor bronze', Int. J. Adv. Manuf. Technol., 2013, 65, (9-12), 1553-1565.; and B. S. Yilbas, S. Akhtar, C, Karatas and C. Chatwin: 'Laser embedding of TiC particles into the surface of phosphor bronze', Surf. Interf. Anal., 2012, 44, (7), 831-836.—each incorporated herein by reference in its entirety]. Although laser treatment improves surface characteristics of bronze, the high temperature gradient generated during the process causes thermally induced cracks and limits the practical application of the treated surface. In addition, the high thermal conductivity of bronze makes the desired thermal texturing difficult to achieve. Consequently, investigation into laser treatment of phosphor bronze as it relates to surface hydrophobicity becomes essential.

Considerable research studies have been carried out to examine laser treatment of bronze surfaces. Characterization of the patina formed on a low tin bronze exposed to aqueous hydrogen sulfide was investigated [M. Chan, A. Capek, D. A. Brill and S. J. Garrett: 'Characterization of the patina formed on a low tin bronze exposed to aqueous hydrogen sulfide', Surf. Interf. Anal., DOI: 10?1002/sia.5520, 2014.—incorporated herein by reference in its entirety]. It was demonstrated that unlike bronzes exposed to oxidizing conditions, which developed protective $SnO_2$ layers, the $H_2S$ (aq.) exposed surface was considerably depleted in Sn. A study on the surface properties of gilt-bronze artifacts after Nd:YAG laser cleaning was also carried out [H. Lee, N. Cho and J. Lee: 'Study on surface properties of giltbronze artifacts, after Nd:YAG laser cleaning', Appl. Surf. Sci., 2013, 284, 235-241.—incorporated herein by reference in its entirety]. This study demonstrated that chemical cleaning removed corrosion products of copper through dissolution; however, the removal was not uniform at the surface. Microstructure and performance of laser cladding on the surface of aluminum bronze was also studied [J.-L. Xu, B. Yang, W. Gao, Z.-P. Wang, D.-W. Long, C.-Y. Ju and T. Yu: 'Microstructure and performance of laser cladding on surface of aluminum bronze', J. Aeronaut. Mater., 2009, 29, (1), 63-67.—incorporated herein by reference in its entirety]. This study demonstrated that the microstructure of cladding was affected by solidification rate and a cellulated crystal microstructure was formed at the surface; however, a dendritic crystal microstructure was present in the middle section of the cladding. Laser surface alloying of a marine propeller bronze using aluminum powder has also been investigated [F. T. Cheng, C. H. Tang and H. C. Man: 'Laser surface alloying of a marine propeller bronze using aluminium powder', Surf Coat. Technol., 2006, 200, (8), 2594-2601.—incorporated herein by reference in its entirety]. This study showed that the difference in galvanic effect between the laser treated and as received samples was small. Laser processing of nickel-aluminum bronze for improved surface corrosion properties has also been examined [R. Cottam, T. Barry, D. McDonald, H. Li, D. Edwards, A. Majumdar, J. Dominguez, J. Wang and M. Brandt: 'Laser processing of nickel-aluminum bronze for improved surface corrosion properties', J. Laser Appl., 2013, 25, (3), DOI: 10.2351/1.4799555.—incorporated herein by reference in its entirety]. The findings revealed that laser processing improved the corrosion resistance of the treated surface. Investigation of laser surface melting of a manganese-nickel-aluminum bronze has also been carried out [C. H. Tang, F. T. Cheng and H. C. Man: 'Effect of laser surface melting on the corrosion and cavitation erosion behaviors of a manganese-nickel-aluminium bronze', Mater. Sci. Eng. A (Struct. Mater.: Proper., Microstr. Process.), 2004, A373, (1-2), 195-203.—incorporated herein by reference in its entirety]. The study indicated that erosion-corrosion synergism constituted a significant contribution to the overall cavitation erosion-corrosion in 3-5 wt % NaCl solutions for the treated surface. Mechanical and electrochemical properties of a laser surface modified titanium alloy for biomedical applications has also been examined [M. E. Khosroshahi, M. Mahmoodi, H. Saeedinasab and M. Tahriri: 'Evaluation of mechanical and electrochemical properties of Ti6Al4V alloy surface modified by Nd:YAG laser for biomedical applications: an in vitro study', Surf. Eng., 2008, 209, 24-27.—incorporated herein by reference in its entirety]. The study showed that a high value of microhardness resulted from the treatment, which could be attributed to grain refinement associated with laser melting and rapid solidification.

Laser melt injection of tungsten carbide (WC) particles on an aluminum surface has also been studied [F. Q. Li, L. Q. Li and Y. B. Chen: Arc Enhanc. Laser Melt Inject. WC Partic. Al Surf., 2013, 29, (4), 296-299.—incorporated herein by reference in its entirety]. The study demonstrated that the powder should be fed from the back side of the laser beam to achieve an appropriate surface enhancement effect. Additionally, the depth of the melt layer increased initially, and then, decreased with increasing laser power. Laser processing of a TiC reinforced composite layer on an Al—Si alloy surface has been investigated as well [A. Viswanathan, D. Sastikumar, U. Kamachimudali, H. Kumar and A. K. Nath: 'TiC reinforced composite layer formation on AlSi alloy by laser processing', Surf. Eng., 2007, 23, (2), 123-128.—incorporated herein by reference in its entirety]. The findings revealed that the layer was free from pores and the TiC and Al—Si phases were almost uniformly distributed in the Ni—Al matrix. Laser ablation of an archaeological bronze plate surface underwater has also been investigated [B. A. Dajnowski: 'Laser ablation cleaning of an underwater archaeological bronze spectacle plate from the H.M.S. DeBraak shipwreck', The International Society for Optical Engineering, Vol. 8790, DOI: 101117/12?2022526, 2013.—incorporated herein by reference in its entirety]. The study indicated that laser ablation provides a clean surface of bronze plate with a minimum of damage.

Fabrication of a super hydrophobic surface on a metal via laser ablation has also been demonstrated [M. H. Kwon, H. S. Shin and C. N. Chu: 'Fabrication of a superhydrophobic surface on metal using laser ablation and electrodeposition', Appl. Surf. Sci., 2014, 288, 222-230.—incorporated herein by reference in its entirety]. This study showed that the spacing of the micro pillars in the array played a major role in the structure hydrophobicity that was confirmed by measuring the water contact angle. In addition, the surface morphology changed relative to the parameters of the laser ablation process. Laser ablation of metal substrates for super hydrophobic effect has also been studied [M. Tang, V. Shim, Z. Y. Pan, Y. S. Choo and M. H. Hong: 'Laser ablation of metal substrates for super-hydrophobic effect', J. Laser Micro Nanoeng., 2011, 6, (1), 6-9.—incorporated herein by reference in its entirety]. This study demonstrated that the pulsed laser ablation was a versatile approach for creating large area super hydrophobic surfaces for industrial applications.

In view of the forgoing, one object of the present disclosure is to provide a method of treating metallic surfaces comprising a copper alloy using laser ablation and application of a $N_2$ assist gas.

BRIEF SUMMARY OF THE INVENTION

According to a first aspect, the present disclosure relates to a method of treating a metallic surface comprising a copper alloy, comprising i) ablating the metallic surface by directing a laser beam with a diameter of 100-400 μm produced by a $CO_2$ laser with a pulse frequency of 1200-1800 Hz onto the metallic surface and ii) concurrently exposing the metallic surface to a $N_2$ assist gas with a pressure of 550-650 KPa to form an ablated metallic surface comprising microgrooves with $Cu_3N$ present on a surface of the microgrooves, wherein the $N_2$ assist gas and the laser beam are oriented coaxially, and wherein the ablated metallic surface has a higher surface hydrophobicity than the metallic surface prior to the ablating.

In one embodiment, the copper alloy is phosphor bronze.

In one embodiment, the metallic surface is ablated with a laser beam having a power in the range of 1.5-2.5 kW.

In one embodiment, the metallic surface is ablated with a laser beam with a scanning speed in the range of 0.05-0.15 $m \cdot s^{-1}$.

In one embodiment, the ablating and concurrently exposing is performed such that laser scanning tracks are formed on the metallic surface and the overlapping ratio of the laser scanning tracks is in the range of 60-80% at the metallic surface.

In one embodiment, the metallic surface is ablated with a laser beam to a penetration depth in the range of 1-10 μm.

In one embodiment, the microgrooves have an average width in the range of 40-60 μm and an average distance between the microgrooves is in the range of 20-30 μm.

In one embodiment, the ablated metallic surface has a surface roughness in the range of 0.05-0.8 μm when measured on a 4 μm by 4 μm area.

In one embodiment, the ablated metallic surface has an average water droplet contact angle in the range of 120-160°.

In one embodiment, the surface hydrophobicity as measured by an average water droplet contact angle of the ablated metallic surface is increased by at least 100% relative to a substantially similar metallic surface that is not treated by the ablating and the concurrently exposing.

In one embodiment, the ablated metallic surface has a Vickers hardness in the range of 3-8 GPa.

In one embodiment, a Vickers hardness of the ablated metallic surface is increased by at least 200% relative to a substantially similar metallic surface that is not treated by the ablating and the concurrently exposing.

In one embodiment, a coefficient of friction of the ablated metallic surface is less than a coefficient of friction of a substantially similar metallic surface that is not treated by the ablating and the concurrently exposing.

In one embodiment, a fracture toughness of the ablated metallic surface is increased in the range of 10-20% relative to a substantially similar metallic surface that is not treated by the ablating and the concurrently exposing.

In one embodiment, the ablated metallic surface has a residual stress that is compressive and in the range of −100 to −500 MPa.

In one embodiment, the metallic surface is not pretreated with hard particles, a film, a resin, nanostructures, or any combination thereof prior to the ablating.

In one embodiment, the method further comprises coating the ablated metallic surface with a hydrophobic layer to form a super hydrophobic metallic surface.

In one embodiment, the hydrophobic layer comprises at least one selected from the group consisting of a fluorocarbon, a perfluorocarbon, a resin, a hydrophobic fatty acid, and a hydrophobic self-assembled monolayer.

According to a second aspect, the present disclosure relates to a method of treating a phosphor bronze surface, comprising i) ablating the phosphor bronze surface by directing a laser beam with a diameter of 100-400 µm produced by a $CO_2$ laser with a pulse frequency of 1200-1800 Hz onto the phosphor bronze surface and ii) concurrently exposing the phosphor bronze surface to a $N_2$ assist gas with a pressure of 550-650 KPa to form an ablated phosphor bronze surface comprising microgrooves with $Cu_3N$ present on a surface of the microgrooves, wherein the $N_2$ assist gas and the laser beam are oriented coaxially, and wherein the ablated phosphor bronze surface has a surface hydrophobicity that is at least 100% higher than a substantially similar phosphor bronze surface that is not treated by the ablating and the concurrently exposing as measured by an average water droplet contact angle.

According to a third aspect, the present disclosure relates to a product comprising a phosphor bronze surface having microgrooves with $Cu_3N$ present on a surface of the microgrooves and an average water droplet contact angle in the range of 120-160°.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
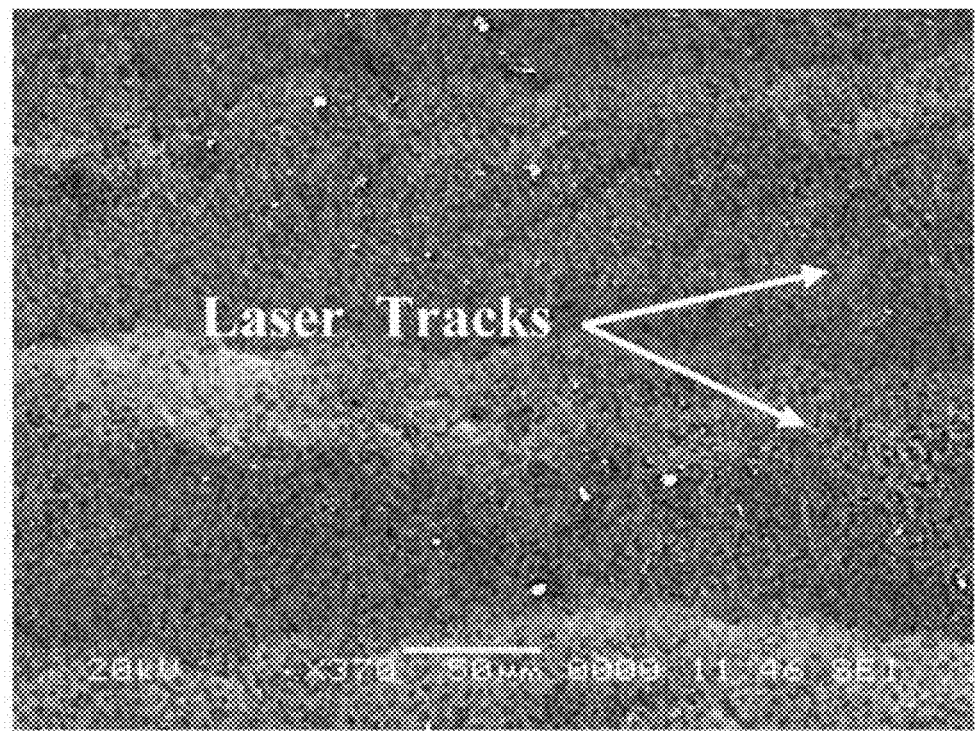
FIG. 1 is a scanning electron microscopy (SEM) image of a laser ablated surface demonstrating the presence of laser scanning tracks.
Figure 2:
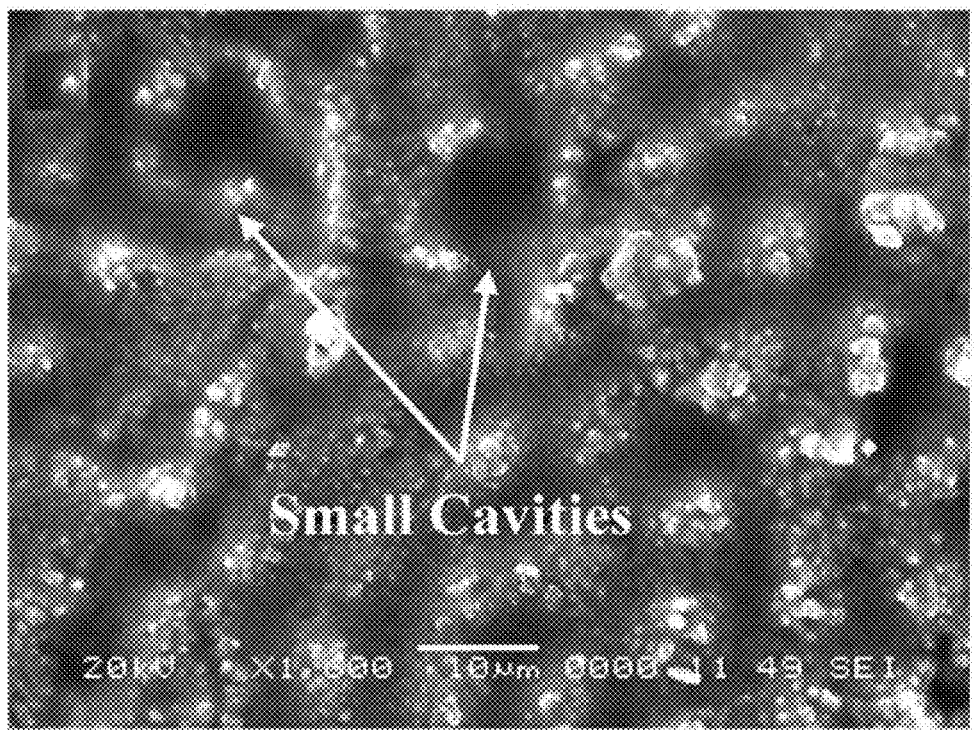
FIG. 2 is a SEM image of a laser ablated surface demonstrating fine size cavities at the ablated surface.
Figure 3:
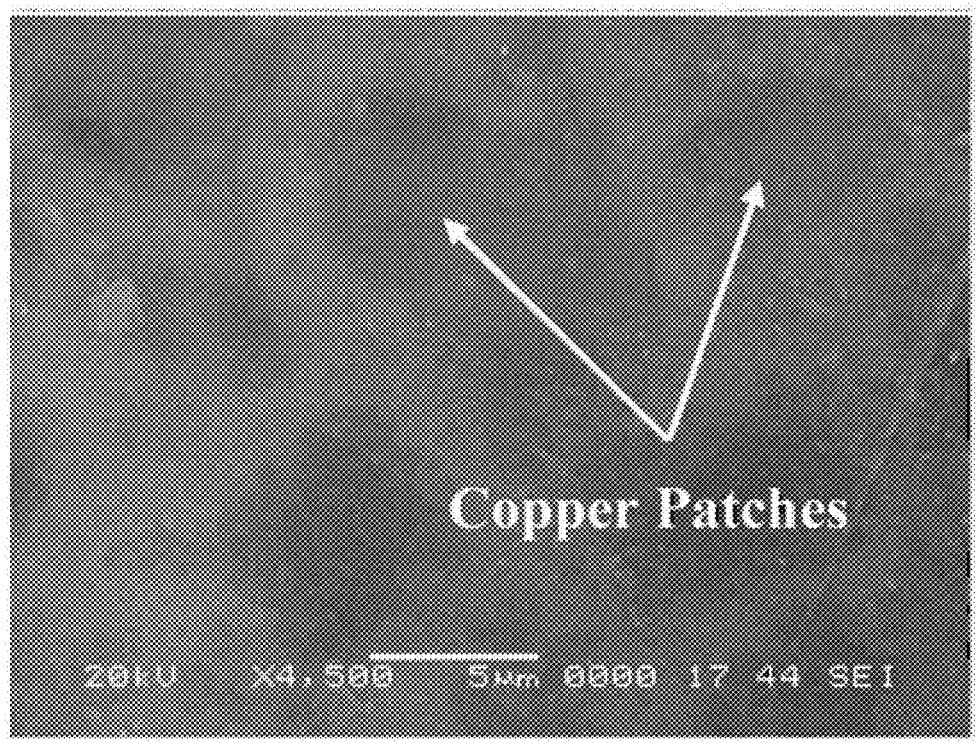
FIG. 3 is a SEM image of a laser ablated surface demonstrating scattered $Cu_3N$ spots.
Figure 4:
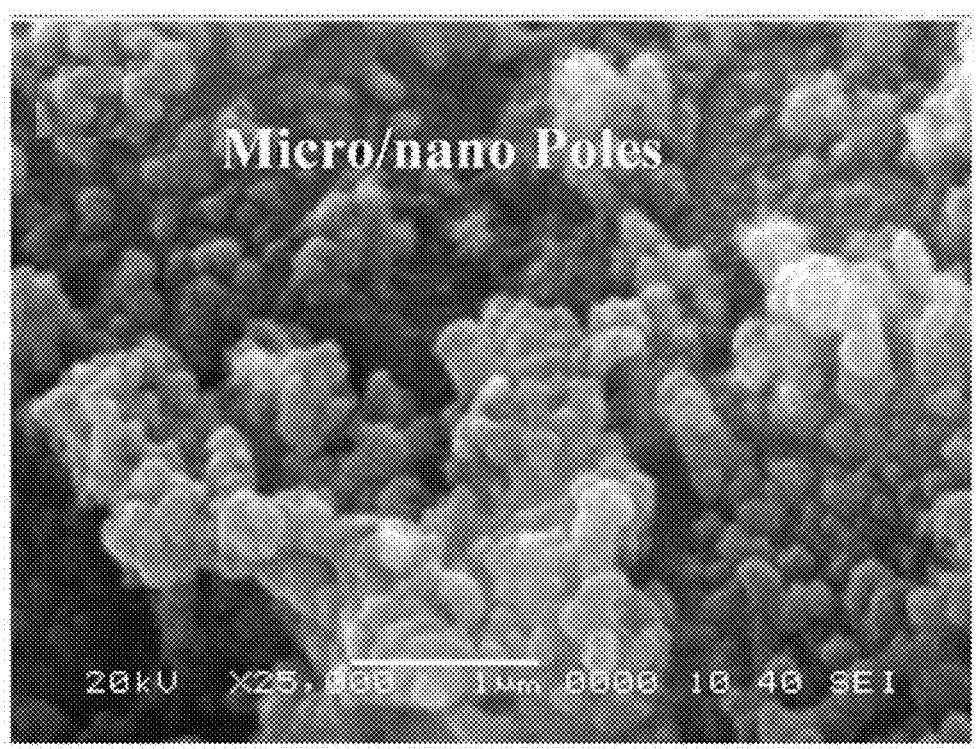
FIG. 4 is a SEM image of a laser ablated surface demonstrating the micro/nano size surface texture.
Figure 5:
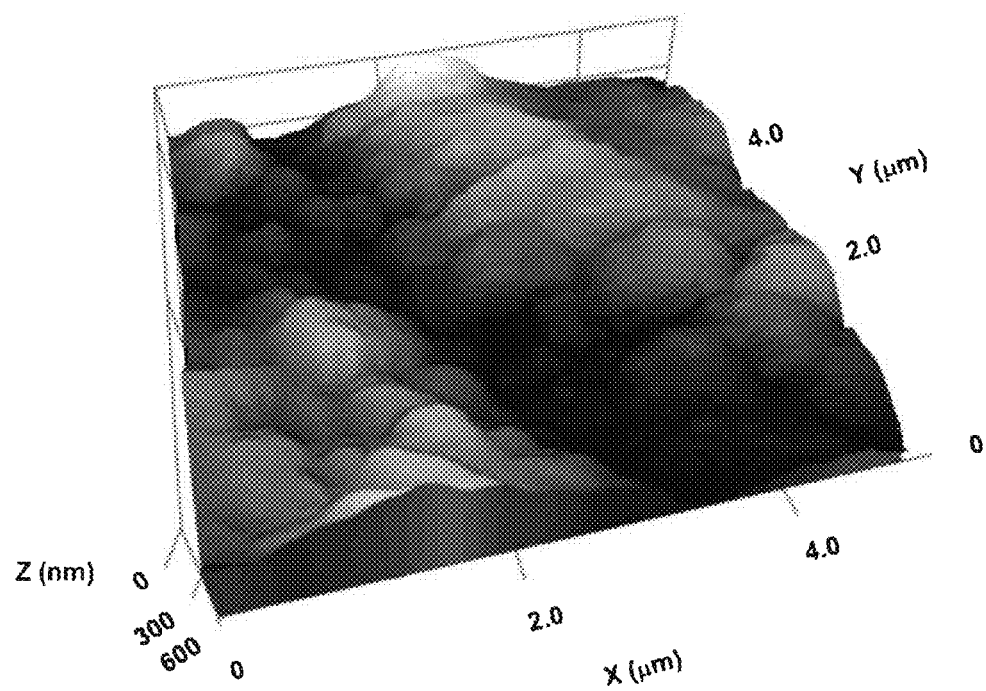
FIG. 5 is an atomic force microscopy (AFM) image of a laser ablated surface demonstrating the roughness of the laser ablated surface.
Figure 6:
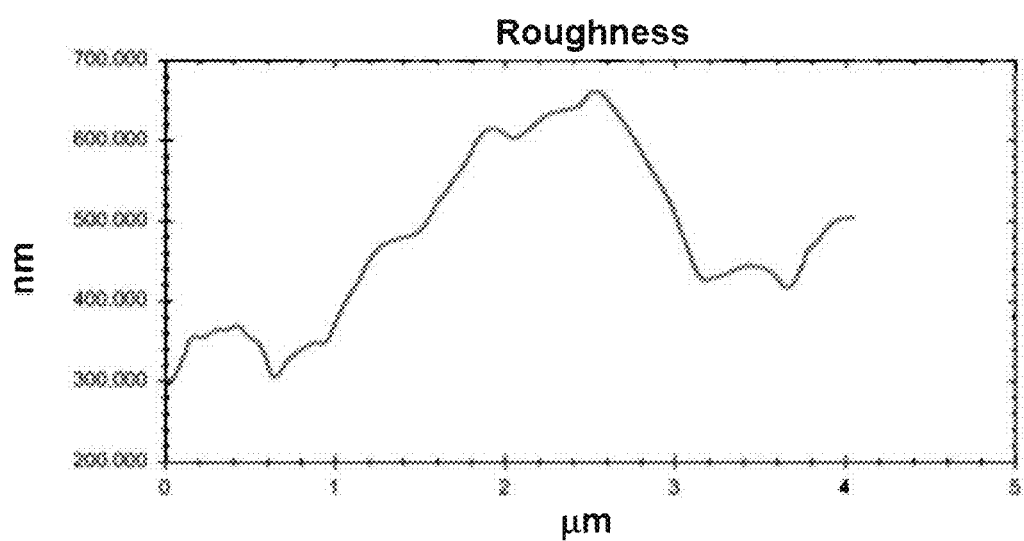
FIG. 6 is a graph of the roughness of the laser ablated surface.
Figure 7:
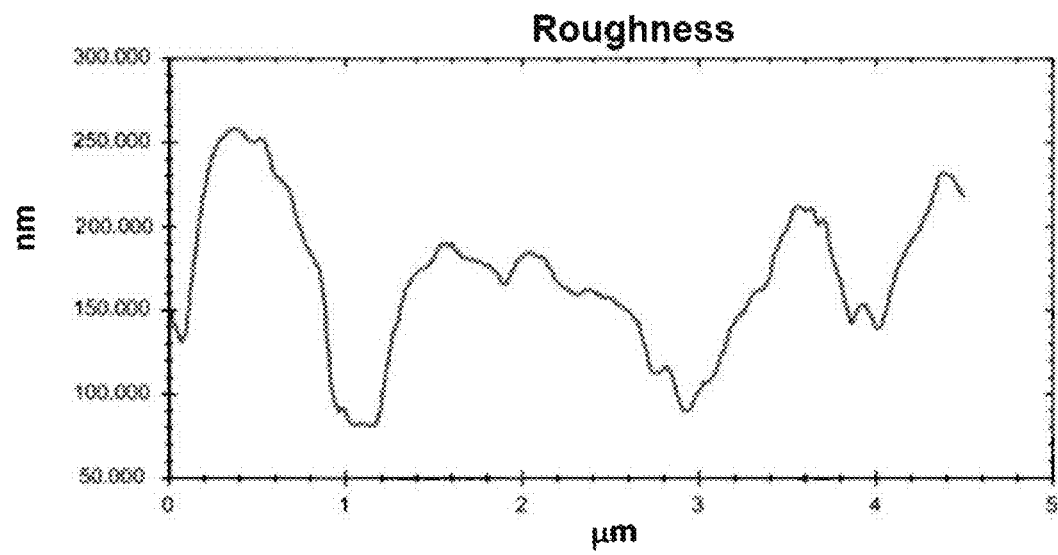
FIG. 7 is a graph of the roughness of the laser ablated surface.
Figure 8:
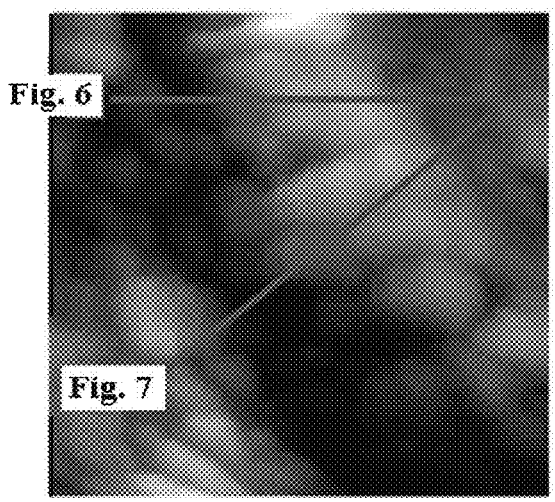
FIG. 8 is an AFM image of the laser ablated surface demonstrating corresponding locations for the roughness measurements shown in FIG. 6 and FIG. 7.

Referring now to the drawings.

According to a first aspect, the present disclosure relates to a method of treating a metallic surface comprising a copper alloy, the method includes ablating the metallic surface by directing a laser beam produced by a $CO_2$ laser onto the metallic surface.

As used herein, copper alloys are metal alloys that have copper as their principal component. They generally have high resistance against corrosion. The most common examples are bronze, wherein tin (Sn) is a significant addition, and brass, wherein zinc (Zn) is a significant addition. The similarity in external appearance of the various alloys, along with the different combinations of elements used when making each alloy often makes categorization of the different compositions difficult. There are upwards of 400 different copper and copper-alloy compositions that are often loosely grouped into categories. In terms of the present disclosure, the copper alloy may refer to any material classified into the broad general exemplary categories including, but not limited to, copper, high copper alloys, brasses, bronzes, copper nickels, copper-nickel-zinc (nickel silver) alloys, leaded copper and special alloys.

In a preferred embodiment the copper alloy of the present disclosure may refer to the most common types and classifications may include, but are not limited to, brass wherein zinc (Zn) is the principal alloying element, phosphor bronze wherein tin (Sn) is the principal alloying element, aluminum bronzes wherein aluminum (Al) is the principal alloying element, silicon bronzes wherein silicon (Si) is the principal alloying element, and copper nickel or nickel silvers wherein nickel (Ni) is the principal alloying element. Additional exemplary types of copper alloys may include, but are not limited to, gilding metal, cartridge brass, yellow or high brass, manganese bronze, naval brass, muntz metal, beryllium copper, free-cutting brass, cupronickel, red brass (gunmetal or ounce metal), semi-red brass, tin bronze, leaded tin bronze, high-leaded tin bronze, and the like. In addition copper is often alloyed with precious metals like silver and gold and the copper alloy of the present disclosure may refer to such compositions, including, but not limited to, Corinthian bronze, hepatizon, tumbaga, shakudo and the like.

In a preferred embodiment, the copper alloy of the present disclosure refers to a bronze copper alloy, more preferably the copper alloy of the present disclosure refers to phosphor bronze. A bronze is an alloy of copper and other metals, most often tin, but also aluminum and silicon. Aluminum bronzes are alloys of copper and aluminum. The content of aluminum ranges mostly between 5-11 wt %. Iron, nickel, manganese and silicon may also sometimes be added. They are recognized for a high strength and corrosion resistance, especially in marine environment, and have low reactivity to sulfur compounds. Aluminum forms a thin passivation layer on the surface of the metal. Additional exemplary bronzes include, but are not limited to bell metal, speculum metal, nickel bronzes (e.g. nickel silver and cupronickel), tungum alloy (UNS C69100), and phosphor bronze. In the present disclosure, the method of manufacturing the copper alloy is not viewed as particularly limiting and should be well known to those of ordinary skill in the art. The majority of alloys are prepared by mixing metals in the molten state and pouring into metal or sand molds and allowing solidification.

In a most preferred embodiment, the copper alloy of the metallic surface is phosphor bronze. As used herein phosphor bronze is defined as an alloy of copper comprising a copper balance, 2-15 wt % tin, and a significant phosphorous content of up to 2.5 wt % relative to the total weight of the phosphor bronze copper alloy. The phosphorous may be added as a deoxidizing agent during melting. These alloys are notable for their toughness, strength, low coefficient of friction, and often fine grain. The phosphorous is also known to improve the fluidity of the molten metal and thereby improve the castability. It also improves mechanical properties by cleaning up the grain boundaries.

In a preferred embodiment, the copper alloy of the present disclosure is phosphor bronze and the phosphor bronze has a tin content of up to 15 wt %, preferably up to 10 wt %, preferably up to 8 wt %, preferably up to 6 wt % and a tin content of at least 2%, preferably at least 4%, preferably at least 6%, such as, for example 2-15 wt % of tin, preferably 3-12 wt % of tin, preferably 3.5-10 wt % of tin, preferably 4-8 wt % of tin or about 6 wt % of tin relative to the total weight of the phosphor bronze copper alloy. In a preferred embodiment, the copper alloy of the present disclosure is phosphor bronze and the phosphor bronze has a significant phosphorous content of up to 2.5 wt %, preferably up to 1.0 wt %, preferably up to 0.5 wt %, preferably up to 0.1 wt % and a phosphorous content of at least 0.01%, preferably at least 0.05%, preferably at least 0.1%, such as, for example 0.01-2.5 wt % of phosphorous, preferably 0.025-2.0 wt % of phosphorous, preferably 0.05-1.0 wt % of phosphorous, preferably 0.075-0.5 wt % of phosphorous or about 0.1 wt % of phosphorous relative to the total weight of the phosphor bronze copper alloy. In a preferred embodiment, the copper alloy of the present disclosure is phosphor bronze and the phosphor bronze has a copper balance content of greater than 50 wt %, preferably greater than 60 wt %, preferably greater than 70 wt %, preferably greater than 80 wt %, preferably greater than 85 wt %, preferably greater than 90 wt %, preferably greater than 91 wt %, preferably greater than 92 wt %, preferably greater than 93 wt % relative to the total weight of the phosphor bronze copper alloy. In addition to copper, tin and phosphorous, other metals may be present in the phosphor bronze copper alloy in either metallic or metal oxide form. In a preferred embodiment, these other metals are present in less than 5 wt %, preferably less than 4 wt %, preferably less than 3 wt %, preferably less than 2 wt %, preferably less than 1 wt %, preferably less than 0.5 wt % relative to the total weight of the phosphor bronze copper alloy. Exemplary other metals that may be present in the phosphor bronze copper alloy include, but are not limited to, Ni, Ga, La, Si, Ti, Mg, Mn, Ca, Ce, Al, Hf, Fe, Ag, Au, Pt, Zn, Bi, Sb, V, Cr, Mo, Cd and the like, and oxides thereof.

As used herein, a "substrate" is defined as any material and/or object that is to be treated using the method or methods described herein in any of their embodiments, and may be made of any material (e.g. a metal, a ceramic, a plastic, a fibrous material, etc.) so long as a surface of the substrate comprises a metallic material (e.g. phosphor bronze), only a surface portion of the substrate needs to comprise the metal comprising a copper alloy. For example, the substrate may be the metal surface partially coated with a ceramic material (e.g. by a sintering process). Exemplary materials comprising the substrate include, but are not limited to, Si, Ge, GaAs, InP, GaN, $SrTiO_3$, $LaAlO_3$, MgO, sapphire, nickel, copper, silver or alloys or combinations thereof. In one embodiment, the metallic surface comprising a copper alloy may substantially cover the substrate, whereby the % surface area coverage of the substrate that is covered with the metallic material is at least 75%, at least 80%, at least 85%, at least 90%, at least 95%, at least 96%, at least 97%, at least 98%, at least 99%. In another embodiment, the metallic surface may incompletely cover, or only cover a portion or portions of the substrate, whereby the % surface area coverage of the substrate that is covered with the metallic material is less than 75%, less than 65%, less than 60%, less than 55%, less than 50%, less than 45%, less than 40%, less than 35%, less than 30%, less than 25%, less than 20%, less than 15%, less than 10%. In another embodiment, the entire substrate and therefore the surface of the substrate is made of a metallic material comprising a copper alloy, for example phosphor bronze.

The method of the present disclosure includes ablating the metallic surface by directing a laser beam produced by a laser onto the metallic surface. As used herein, laser ablation refers to the process of removing material from a solid surface by irradiating it with a laser beam. At low laser flux, the material may be heat by the absorbed laser energy and evaporate, sublimate, or otherwise be separated from the surface by exposure to laser energy, preferably in the presence of a gas flow. At high laser flux, the material is typically converted to a plasma. Usually, laser ablation refers to removing material with a pulsed laser, but it is possible to ablate material with a continuous wave laser beam if the laser intensity is high enough.

The depth over which the laser energy is absorbed, and thus the amount of material removed by a single laser pulse depends on a number of factors including, but not limited to, the material's optical properties and the laser wavelength and pulse length. The total mass ablated from the target per laser pulse is referred to as the ablation rate. Features of laser radiation such as laser beam scanning velocity and the covering of scanning lines can significantly influence the ablation process. Laser pulse can vary over a wide range of durations (milliseconds to femtoseconds) and fluxes, and can be precisely controlled. The simplest application of laser ablation is to remove material from a solid in a controlled fashion; very short laser pulses remove material so quickly that the surrounding material absorbs very little heat.

A laser differs from other sources of light in that lasers emit light coherently. Spatial coherence allows a laser to be focus to a tight spot, and also allows a laser beam to stay narrow over long distances. The beam provides a concentrated heat source, allowing for narrow, deep etchings and high rates. Additionally, laser energy can be selectively absorbed by materials comprising the substrate, particularly on metal, so $CO_2$ or ND:YAG pulsed lasers can be used to purify surfaces or prepare surfaces for an application without damaging the underlying surface. High power lasers can clean a large spot with a single pulse. Lower power lasers use many small pulses which may be scanned across an area. The technique of ablating a surface (e.g. the metallic surface) with a laser has advantages including high speed operation, easily automated operation, low cost, high precision, local treatment, and minimal target heating.

Types of lasers that can be used for ablating the metallic surface in the present disclosure include, but are not limited to, helium-neon lasers, argon lasers, krypton lasers, xenon ion lasers, nitrogen lasers, carbon dioxide ($CO_2$) lasers, carbon monoxide lasers, excimer lasers, hydrogen fluoride lasers, deuterium fluoride lasers, chemical oxygen-iodine lasers, all gas-phase iodine lasers, dye lasers, ruby laser, yttrium-aluminum-garnet (YAG) lasers (e.g. YAG and any of Nd, Cr, Er, Y, Ca, glass, Th, Yb, Ho), and the like, so long as the laser can be used in conjunction with a $N_2$ assist gas. In a preferred embodiment, the metallic surface is ablated by directing a laser beam produced by a $CO_2$ laser onto the metallic surface. In one embodiment, the $CO_2$ laser produces a laser beam of infrared light having an operation wavelength of 8.0-12.0 μm, preferably 8.5-11.5 μm, preferably 9.0-11.0 μm, preferably 9.4-10.6 μm. In one embodiment, the $CO_2$ laser is powered by a traverse pump (high power). In an alternative embodiment, the $CO_2$ laser is powered by a longitudinal electrical discharge pump (low power). The $CO_2$ laser may also have an efficiency rating, as defined by the ratio of output power to pump power, of up to 25%, preferably up to 22%, preferably up to 20%, preferably up to 18% or up to 16%.

In one embodiment, the $CO_2$ laser comprises a focusing lens with a nominal focal length of 120-131 mm, preferably 121-131 mm, preferably 122-131 mm, preferably 123-131 mm, preferably 124-130 mm, preferably 125-129 mm, preferably 126-128 mm, or about 127 mm. In a preferred embodiment, the laser beam produced by the $CO_2$ laser has a diameter of at least 100 μm, at least 140 μm, at least 180 μm, at least 200 μm, at least 220 μm, at least 240 μm, at least 260 μm, at least 280 μm, at least 300 μm and no more than 400 μm, no more than 380 μm, no more than 360 μm, no more than 340 μm, no more than 320 μm, no more than 310 μm. For example, in the range of 100-400 μm, preferably 100-300 μm, preferably 110-280 μm, preferably 120-260 μm, preferably 160-240 μm, preferably 180-220 μm, or about 200 μm.

In a preferred embodiment, the ablating is performed by directing a laser beam produced by a laser with a pulse frequency of 1200-1800 Hz, preferably 1300-1700 Hz, preferably 1400-1600 Hz, or about 1500 Hz onto the metallic surface. As used herein, pulse frequency refers to a measure of the number of cycles of emitted light per second, with each cycle of emitted light ("on time") being separated by intermittent "off time". As used herein, duty indicates the on/off ratio of the laser beam for every one cycle. A higher duty indicates that the laser has a higher ratio of "on time" compared to "off time". In the present method, the laser may have a duty of 20-90%, 30-80%, 40-70%, 45-65%.

In a preferred embodiment, the metallic surface is ablated with a laser beam having a power in the range of 1.5-2.5 kW, preferably 1.6-2.4 kW, preferably 1.7-2.3 kW, preferably 1.8-2.2 kW, preferably 1.9-2.1 kW, or about 2.0 kW. In a preferred embodiment, the metallic surface is ablated with a laser beam with a scanning speed (also referred to as "feed rate") in the range of 0.05-0.15 m·s$^{-1}$, preferably 0.07-0.13 m·s$^{-1}$, preferably 0.08-0.12 m·s$^{-1}$, preferably 0.09-0.11 m·s$^{-1}$. In a preferred embodiment, the metal surface is ablated with a laser beam having a penetration depth of 1-10 μm, preferably 3-8 μm, preferably 3.4-7.6 preferably 3.8-7.2 μm, preferably 4.2-6.8 μm, preferably 4.6-6.4 μm, or about 5.0 μm. In some embodiments, the laser beam penetration depth is shallow in order to form ablated surfaces with a "low roughness", wherein the laser beam penetration depth is about 3-5 μm, about 4-5 μm, or about 4.5-5 μm. In some embodiments, the laser beam penetration depth is deep to form ablated surfaces with a "high roughness", wherein the laser beam penetration depth is about 5-8 preferably 5-7 μm, preferably 5-6 μm, or about 5-5.5 μm.

In addition to the ablating, the method of the present disclosure also involves concurrently exposing the metallic surface to a $N_2$ assist gas to form an ablated metallic surface comprising microgrooves with $Cu_3N$ present on a surface of the microgrooves, wherein the $N_2$ assist gas and the laser beam are oriented co-axially. In a preferred embodiment, the metallic surface is exposed to a $N_2$ assist gas with a pressure of 550-650 KPa, preferably 560-640 KPa, preferably 570-630 KPa, preferably 580-620 KPa, preferably 590-610 KPa, or about 600 KPa. In one embodiment, the metallic surface is exposed to a $N_2$ assist gas with a flow rate of 1500-2500 L/h, preferably 1600-2400 L/h, preferably 1700-2300 L/h, preferably 1800-2200 L/h, preferably 1900-2100 L/h.

In addition to various components common to lasers including, but not limited to, gain medium, high reflector, output coupler, a pump such as a flash lamp, an optical cavity, etc., the laser used in the present method may have a conical nozzle for applying the $N_2$ assist gas in co-axially with the laser beam. In one embodiment, the nozzle may have a diameter of 1.0-2.0 mm, preferably 1.2-1.8 mm, preferably 1.4-1.6 mm, or about 1.5 mm. Further, other types of laser ablation nozzles having multiple passageways may be used in the present method described herein. As used herein, a "nozzle gap" refers to the distance between the tip of the nozzle of the laser and the metallic surface. When ablating a metallic surface using a high-pressure assist gas, it is advantageous to use a small nozzle gap as a small nozzle gap uses the assist gas more efficiently. Therefore, in one embodiment, a nozzle gap used for the ablating and the concurrently exposing is 1.0-2.0 mm, preferably 1.1-1.9 mm, preferably 1.2-1.8 mm, preferably 1.3 to 1.7 mm, preferably 1.4-1.6 mm, or about 1.5 mm.

As used herein, surface roughness, or roughness, refers to a component of surface texture. It is quantified by the deviations in the direction of the normal vector of a real surface from its ideal form. If these deviations are large, the surface may be considered "rough" and if they are small, the surface may be considered "smooth". Roughness is typically considered to be the high frequency, short wavelength component of a measured surface, and plays and important role in determining how the surface will interact with its environment. In a preferred embodiment, the ablated metallic surface has a surface roughness in the range of 0.05-0.80 μm, preferably 0.10-0.60 μm, preferably 0.15-0.50 μm, preferably 0.20-0.40 μm, preferably 0.25-0.35 μm when measured on an area of up to 4 μm by 4 μm. In one embodiment, the ablated metallic surface or sections of the ablated metallic surface may have a high surface roughness in the range of 0.30-0.80 μm, preferably 0.35-0.70 μm, preferably 0.40-0.60 μm. In another embodiment, the ablated metallic surface or sections of the ablated metallic surface may have a low surface roughness in the range of 0.05-0.30 μm, preferably 0.10-0.25 μm, preferably 0.15-0.20 μm. In one embodiment, the surface roughness of the ablated metallic surface may be determined using atomic force microscopy (AFM).

Laser ablation takes place during the irradiation of repetitive laser pulses along the laser scanning direction, in which case, the ablated metallic surface forms regular laser scanning tracks or microgrooves. In a preferred embodiment, the microgrooves have an average width of 40-60 μm, preferably 45-55 μm, preferably 48-52 μm, or about 50 μm and the average distance between the microgrooves is in the range of 20-30 preferably 21-29 μm, preferably 22-28 μm, preferably 23-27 μm, preferably 24-26 μm, or about 25 μm. Nanogrooves (i.e. grooves having an average width of less than 100 nm) may also be present on the ablated metallic surface, but the presence of these nanogrooves is rare. During the treatment process, and depending on the various ablation conditions, such as for example the width of the laser beam the laser scanning speed and the pulse frequency, the ablating may form ablated/melting tracks at the ablated metallic surface. Since the laser pulse frequency is 1200-1800 Hz and the laser scanning speed is 0.05-0.15 m·s−1, overlapping of irradiated spots occurs at the surface. In a preferred embodiment, the overlapping ratio is in the range of 60-80%, preferably 62-78%, preferably 65-75%, or about 70%.

Treating the metallic surface with the method of the present disclosure in any of its embodiments may result in the formation of a dense layer at the metallic surface due to high cooling rates in this region. The dense layer may consist of fine grains and/or closely spaced fine dendrites. In this case, the surface layer has a higher density than that of the untreated substrate below the dense layer (i.e. below the laser beam penetration depth). For example, phosphor bronze (i.e. having a phosphor content of less up to 1 wt % and a tin content of less than 10 wt %) that is untreated by the ablating described herein has a density of about 8.90 g/cm$^3$. Therefore, in one embodiment, the method forms a dense layer at the metallic surface having a density of greater than 8.90 g/cm$^3$, preferably greater than 9.00 g/cm$^3$, preferably greater than 9.20 g/cm$^3$, preferably greater than 9.40 g/cm$^3$, preferably greater than 9.60 g/cm$^3$, preferably greater than 9.80 g/cm$^3$, preferably greater than 10.00 g/cm$^3$, preferably greater than 10.20 g/cm$^3$.

In one embodiment, the metallic surface is a phosphor bronze copper alloy and the ablated metallic surface comprises phosphor bronze copper alloy having microgrooves with $Cu_3N$ present on a surface of the microgrooves. Therefore, in one embodiment, the surface portion of the ablated ceramic surface (i.e. the portion which was ablated or in contact with the laser beam and the $N_2$ assist gas) comprises 2-8 wt % Sn, 1-8 wt % N, 0.01-1 wt % P and the balance is Cu, preferably 3-7 wt % Sn, 2-7 wt % N, 0.05-0.5 wt % P and the balance is Cu, more preferably 5-6 wt % Sn, 4-7 wt % N, 0.08-0.25 wt % P and the balance is Cu.

As used herein, surface hydrophobicity is a measure of the wetting properties of a material's surface and relates to the difficulty or ease by which the surface is wet. In a number of technology fields and industrial application, materials with one or more hydrophobic surfaces or one or more super hydrophobic surfaces are advantageous due to their self-cleaning properties and relative difficulty to wet which in an antibacterial setting may reduce and minimize the contact area of bacterial fluid. One measure for surface hydrophobicity is the droplet contact angle of a liquid, common and exemplary liquids include, but are not limited to, water, glycerol and diiodomethane. As used herein, the term "hydrophobic" surface generally refers to surfaces which have a contact angle from 90-150° with a droplet of water, and the term "superhydrophobic" surface generally refers to surfaces which have a contact angle greater than 150° with a droplet of water. In a preferred embodiment, the ablated metallic surface has a higher surface hydrophobicity than the metallic surface prior to the ablating. In one embodiment, the contact angle of the metallic surface and the ablated metallic surface may be determined using a contact angle goniometer.

In one embodiment, the ablated metallic surface has an average water droplet contact angle of at least 95°, preferably at least 98°, preferably at least 100°, preferably at least 105°, preferably at least 120°, preferably at least 121°, and no more than 170°, no more than 165°, no more than 160°, no more than 155°, no more than 150°. For example, the ablated metallic surface has an average water droplet contact angle in the range of 120-160°, preferably 130-155°, preferably 140-150°, preferably 142-148°. In one embodiment, the ablated metallic surface may have a high surface roughness and the average water droplet contact angle may be in the range of 95-140°, preferably 110-135°, preferably 120-140°. In one embodiment, the ablated metallic surface may have a low surface roughness and the average water droplet contact angle may be in the range of 140-170°, preferably 145-165°, preferably 147-160°, preferably 150-158°. In one embodiment, the method increases the surface hydrophobicity as measured by an average water droplet contact angle of the ablated metallic surface by at least 100%, preferably at least 110%, preferably at least 120%, preferably at least 130%, preferably at least 140%, preferably at least 150%, preferably at least 160% relative to a metallic surface that is not treated by the ablating and the concurrently exposing (i.e. the percent increase in water droplet contact angle from the metallic surface to the ablated metallic surface).

In one embodiment, the ablated metallic surface has an average glycerol droplet contact angle of 110-170°, preferably 120-160°, preferably 130-150°. In one embodiment, the method increase the surface hydrophobicity of the metallic surface by at least 110%, at least 120%, at least 150%, at least 180%, at least 200% relative to a metallic surface that is not treated by the ablating and the concurrently exposing as measured by an average glycerol droplet contact angle. In one embodiment, the ablated metallic surface has an average diiodomethane droplet contact angle of 30-70°, preferably 35-60°, preferably 40-50°. In one embodiment, the method increase the surface hydrophobicity of the metallic surface by at least 75%, at least 80%, at least 90%, at least 95%, at least 100% relative to a metallic surface that is not treated by the ablating and the concurrently exposing as measured by an average diiodomethane droplet contact angle.

As used herein, the Vickers hardness test refers to a method to measure the hardness of materials. In the Vickers test, the required calculations are independent of the size of the indenter, and the indenter can be used for all materials irrespective of hardness. The basic principle, as with common measure of hardness, is to observe the questioned material's ability to resist plastic deformation. The Vickers test can be used for all metals and has one of the widest scales among hardness test, the unit of hardness given by the test may be a Vickers Pyramid Number (HV) or a Diamond Pyramid Hardness (DPH). The hardness number can be converted into units of pascals, but doesn't refer to pressure. The hardness number is determined by the load over the surface area of the indentation and not the area normal to the force, and is therefore not pressure. In a preferred embodiment, the ablated metallic surface has a Vickers hardness in the range of 3-8 GPa, preferably 3.5-7.5 GPa, preferably 4-7 GPa, preferably 4.5-6.5 GPa, preferably 5-6.25 GPa, preferably 5.25-6.10 GPa, preferably 5.35-6 GPa, preferably 5.5-5.75 GPa, or about 5.6-5.7 GPa. In a preferred embodiment, the method of the present disclosure increases the Vickers hardness of the ablated metallic surface by at least 200%, preferably at least 250%, preferably at least 300%, preferably at least 325%, preferably at least 350%, preferably at least 375%, preferably at least 400%, preferably at least 410%, preferably at least 425%, preferably at least 450%, preferably at least 500% relative to a substantially similar metallic surface that is not treated by the ablating and the concurrently exposing of the present method described herein.

As used herein, residual stress refers to stresses that remain in a solid material after the original cause of the stresses has been removed. Residual stress may be desirable or undesirable. Residual stress can occur through a variety of mechanisms including inelastic (i.e. plastic) deformations, temperature gradients (i.e. during thermal cycle) or structural changes (i.e. phase transformation). In a preferred embodiment, the ablated metallic surface has a residual stress that is compressive and in the range of −100 to −500 MPa, preferably −200 to −450 MPa, preferably −250 to −425 MPa, preferably −275 to −410 MPa, preferably −300 to −400 MPa, preferably −325 to −375 MPa, or about −350 MPa.

As used herein, fracture toughness refers to a property which describes the ability of a material containing a crack to resist fracture, and it is important to many design applications. The linear-elastic fracture toughness of a material is determined from the stress intensity factor at which a thin crack in the material begins to grow; it can be denoted with the units of Pa$\sqrt{m}$ or psi$\sqrt{in}$. In one embodiment, the ablated metallic surface has a fracture toughness of 20-180 MPa$\sqrt{m}$, preferably 25-160 MPa$\sqrt{m}$, preferably 30-140 MPa$\sqrt{m}$, preferably 35-120 MPa$\sqrt{m}$, preferably 40-100 MPa$\sqrt{m}$, preferably 45-80 MPa$\sqrt{m}$, preferably 50-60 MPa$\sqrt{m}$. In a preferred embodiment, the method of the present disclosure increases the fracture toughness of the ablated metallic surface by a percentage in the range of 10-20%, preferably 12-18%, preferably 13-17% relative to a substantially similar metallic surface that is not treated by the ablating and the concurrently exposing of the present method described herein.

As used herein, the coefficient of friction is a dimensionless scalar value which describes the ratio of the force of friction between two bodies and the force pressing them together. In general, coefficients of friction range from near zero to greater than one. In one embodiment, the ablated metallic surface has a coefficient of friction in the range of 0.05-0.50, preferably 0.10-0.45, preferably 0.20-0.40, preferably 0.25-0.35. In a preferred embodiment, the method of the present disclosure decreases the coefficient of friction of the ablated metallic surface relative to a substantially similar metallic surface that is not treated by the ablating and the concurrently exposing of the present method described herein, the coefficient of friction of the ablated metallic surface is less than the coefficient of friction of a substantially similar metallic surface that is not treated by the ablating and the concurrently exposing.

In a preferred embodiment, the metallic surface is not pretreated with hard particles, a film, a resin, nanostructures, or any combination thereof prior to the ablating. Therefore, the metallic surface is directly ablated with the laser beam along with concurrent application of the $N_2$ assist gas. In this respect, in a preferred embodiment, any $Cu_3N$ present on the ablated metallic surface is formed by the method described herein (i.e. which causes the conversion of the copper alloy to $Cu_3N$), and not from any depositing of preformed $Cu_3N$ onto a surface to be ablated. Exemplary hard particles include, but are not limited to, TiC, ZrC, WC, $B_4C$, ZrN, TiN, YN, VN, WN, GaN, AlN, HfN, TaN, NbN, InN, $Si_3N_4$, $Zn_3N_2$, or metal particles comprising Sc, Y, La, Ce, Pr, Nd, Pm, Sm, Eu, Gd, Tb, Dy, Ho, Er, Tm, Yb, Lu, Pd, Ta, Zr, Ti, Ir, Hf, Pt, Au, Ni, Zn, Mg, Cu, Al and the like and combinations thereof. Such hard particles may be nanosized and therefore may be also meet the definition of nanostructures. For example, nanosized hard particles comprising $TiO_2$, $ZrO_2$, and/or $Cu_2O$ are considered nanostructures for the purposes of the present disclosure. Exemplary resins and/or films include, but are not limited to, films or resins made from carbon layers or carbon sheets, phenolic resins, epoxy resins (e.g. bisphenol A and F epoxy resins, glycidylamine epoxy resin, aliphatic epoxy resin, etc.), polystyrene (PS), poly(methylmethacralate), manganese oxide polystyrene ($MnO_2$/PS) nanocomposite, zinc oxide polystyrene (ZnO/PS) nanocomposite, precipitated calcium carbonate, carbon nanotube structures, silica nanocoating, nanopin film, and the like.

In one embodiment, the method described herein in any of its embodiments may further comprise coating the ablated metallic surface with a hydrophobic layer to form a more hydrophobic and/or superhydrophobic metallic surface. It is envisaged that adding one or more hydrophobic layers to an already ablated metallic surface as defined herein may increase the surface contact angle, and therefore the hydrophobicity of the surface.

In one embodiment, the hydrophobic layer comprises at least one selected from the group consisting of a fluorocarbon, a perfluorocarbon, a resin, a hydrophobic fatty acid and a hydrophobic self-assembled monolayer. Exemplary fluorocarbons and perfluorocarbons include, but are not limited to, i) fluoroalkanes such as carbon tetrafluoride, perfluoroocatane, perfluoro-2-methylpentane, perfluorooctanoic acid, perfluoro-1,3-dimethylcyclohexane, perfluorodecalin, hexafluoroethane, perfluoropentane, pefluoromethylcyclohexane, perfluoro-1,3-dimethylcyclohexane, perfluoromethyldecalin, ii) fluoroalkenes/fluoralkynes such as perfluoroisobutene, tetrafluoroethylene, hexafluoropropylene, hexafluorobutyne, iii) perfluoroaromatic compounds such as hexafluorobenzene, octafluorotoluene, and octafluoronapthalene and iv) fluoropolymers such as polyvinylfluoride, polyvinylidene fluoride, polytetrafluoroethylene, polychlorotrifluoroethylene, fluorinated ethylene-propylene, perfluropolyether, perfluoropolyoxetane, pefluoroalkoxy polymer, polyethylenetetrafluoroethylen, polyethylenechlorotrifluoroethylene, and the like. Exemplary resins that may be applied after the ablating and the concurrently exposing have been mentioned heretofore (e.g. epoxy resins, phenolic resins, etc.).

The hydrophobic fatty acid that may be used to coat the ablated metallic surface may be selected from the group including, but not limited to propanoic acid, butanoic acid, pentanoic acid, hexanoic acid, heptanoic acid, octanoic acid, nonanoic acid, decanoic acid, undecanoic acid, dodecanoic and, tridecanoic acid, tetradecanoic acid, pentadecanoic acid, hexadecanoic acid, heptadecanoic acid, octadecanoic acid, nonadecanoic acid, eicosanoic acid, heneicosanoic acid, docosanoic acid, tricosanoic acid, tetracosanoic acid, pentacosanoic acid, hexacosanoic acid, heptacosanoic acid, octacosanoic acid, nonacosanoic acid, triacontanoic acid, henatriacontanoic acid, dotriacontanoic acid, tritriacontanoic acid, tetratriacontanoic acid, pentatriacontanoic acid, hexatriacontanoic acid and combinations thereof.

As used herein, self-assembled monolayers (SAM) refer to molecular assemblies formed spontaneously on surface by adsorption and are essentially organized into ordered domains. In some cases the molecules that form the monolayer may not interact strongly with the substrate. In other cases the molecules may possess a head group that has a strong affinity for the substrate and may anchor the molecule to it (e.g. a thiol to a metal surface). In one embodiment, the ablated metallic surface is coated with a hydrophobic layer comprising a self-assembled monolayer. Exemplary self-assembled monolayers include, but are not limited to, (11-mercatoundecyl)tetra(ethylene glycol), [11-(methylcarbonylthio)undecyl]-tetra-(ethylene glycol), tetra(ethylene glycol) dithiol, 1-hexadecanethiol and the like.

According to a second aspect, the present disclosure relates to a method of treating a phosphor bronze surface, comprising i) ablating the phosphor bronze surface by directing a laser beam with a diameter of 100-400 μm, preferably 100-300 μm, preferably 110-280 μm, preferably 120-260 μm, preferably 160-240 μm, preferably 180-220 μm, or about 200 μm produced by a $CO_2$ laser with a pulse frequency of 1200-1800 Hz, preferably 1300-1700 Hz, preferably 1400-1600 Hz, or about 1500 Hz onto the phosphor bronze surface and ii) concurrently exposing the phosphor bronze surface to a $N_2$ assist gas with a pressure of 550-650 KPa, preferably 560-640 KPa, preferably 570-630 KPa, preferably 580-620 KPa, preferably 590-610 KPa, or about 600 KPa to form an ablated phosphor bronze surface comprising microgrooves with $Cu_3N$ present on a surface of the microgrooves, wherein the $N_2$ assist gas and the laser beam are oriented coaxially, and wherein the ablated phosphor bronze surface has a surface hydrophobicity that is at least 100%, preferably at least 120%, preferably at least 140%, preferably at least 160% higher than a substantially similar phosphor bronze surface that is not treated by the ablating and the concurrently exposing as measured by an average water droplet contact angle. In a preferred embodiment, the phosphor bronze surface is not pretreated with hard particles, a film, a resin, nanostructures, or any combination thereof prior to the ablating.

According to a third aspect, the present disclosure relates to a product comprising a phosphor bronze surface having microgrooves with $Cu_3N$ present on a surface of the microgrooves and an average water droplet contact angle in the range of 120-160°, preferably 130-155°, preferably 140-150°, preferably 142-148°.

In one embodiment the product may have antimicrobial characteristics along with the improved hydrophobicity of the alloy surface which minimizes the stains left over by infected fluids, which is vital for hygienic concerns in medical applications. The surfaces of copper and its alloys, such as brass and bronze are antimicrobial. They have the inherent ability to kill a wide range of harmful relatively rapidly and with a high degree of efficiency. In one embodiment, the product may be an antimicrobial copper alloy touch surface. These surfaces can prevent frequently touched surfaces from serving as reservoirs for the spread of pathogenic microbes. This is especially vital in healthcare facilities, where harmful viruses, bacteria, and fungi colonize and persist on such surfaces as doorknobs, push plates, railings, tray tables, tap and faucet handles, IV poles, HVAC systems and other equipment. Microbes can often surfaces for surprisingly long periods of time, some more than 30 days. In one embodiment, the product has strong efficacies as sanitizers, residual self-sanitizing after multiple wet-dry cycles, and continuous reductions of bacterial contaminants. Exemplary products may include, but are not limited to sinks, keyboards, faucets, IV poles, tables, stretcher rails, railings, hampers, decorative and architectural hardware (levers, grips, knobs, pulls, towel bars, grab bars, kick plates, bath accessories, outlet covers, light switch covers), laboratory incubators, cabinet hardware, decorative tile, free weights, and the like.

In another embodiment, the product may have important applications in the maritime industry. They can yield skin friction drag reduction for the hulls of ships allowing ships to increase their speed and range while increasing fuel efficiency and decreasing fuel costs. They can also reduce corrosion and prevent marine organisms from growing on the hulls of ships. The product may be anti-corrosive and/or anti-icing, have cleaning capabilities or be used to protect circuits and grids.

The examples below are intended to further illustrate methods and protocols for treating and characterizing the laser ablated metallic surfaces comprising a copper alloy and laser ablated metallic surface comprising phosphor bronze of the present disclosure. Further, they are intended to illustrate assessing the properties of these laser ablated metallic surfaces. They are not intended to limit the scope of the claims.

EXAMPLE 1

Laser Ablation Experiment

A $CO_2$ laser (LC-ALPHAIII) delivering a nominal output power of 2 kW was used to ablate the workpiece surface. The nominal focal length of the focusing lens was 127 mm. The laser beam diameter focused at the workpiece surface was on the order of 200 μm. Nitrogen assist gas emerging from the conical nozzle and co-axial with the laser beam was used. The laser surface ablation process was carried out with different laser parameters. In this case, reducing laser output power below 2 kW resulted in high surface roughness due to melt flow over the surface. In addition, reducing laser scanning speed below 10 cm s$^{-1}$ increased the surface roughness due to over melting at the surface. Alternatively, evaporation at the surface ceased and melting took place along the scanning tracks with increasing laser scanning speeds beyond 10 m s$^{-1}$. Therefore, through experimentation, the optimal laser parameters resulting in surface ablation with low surface roughness were selected. The laser ablation parameters are given in Table 1. The laser treatment experiments were repeated three times to ensure almost the same topology at the surface.

TABLE 1

| Optimized laser ablation conditions used in the method | | | | | | |
|---|---|---|---|---|---|---|
| Scanning speed (m s$^{-1}$) | Power (W) | Frequency (Hz) | Nozzle Gap (mm) | Nozzle diameter (mm) | Focus setting (mm) | $N_2$ pressure (kPa) |
| 0.1 | 2000 | 1500 | 1.5 | 1.5 | 127 | 600 |

Phosphor bronze having the elemental composition of 6 wt % Sn, 0.1 wt % P, and the balance of Cu was used in the experiments. The samples were prepared from phosphor bronze sheet with size parameters of 3 mm in thickness and 20 mm length by 20 mm width. Laser controlled ablation of the phosphor bronze surface is carried out for improved hydrophobicity. Morphology, hydrophobicity, and metallurgical and mechanical characterization of the laser treated layer are assessed using the analytical tools known to those of ordinary skill in the art.

EXAMPLE 2

Characterization Methods of Laser Ablated Surfaces

Material characterization of the laser ablated surfaces was carried out using scanning electron microscopy (SEM), energy-dispersive X-ray spectroscopy (EDS), atomic force microscopy (AFM), and X-ray diffraction (XRD) spectroscopy. A Jeol 6460 electron microscope was used for the SEM examination and a Bruker D8 Advanced with CuKα radiation was used for the XRD analysis. A typical setting for the XRD system was 40 kV and 30 mA, the scanning angle (2θ) was ranged over 20-80°. The parabolically shaped Gobel Mirror was used in the Bruker D8 Advanced, this provided highly parallel X-ray beams. The texture analysis of the laser ablated surfaces was performed using an AFM, Agilent 5100 AFM/SPM, in contact mode. The tip was made of a silicon nitride probe (r=20-60 nm) with a manufacturer specified force constant k of 0.12 N m$^{-1}$.

A microphotonics digital hardness tester (MP-100TC) was used to obtain Vickers microindentation hardness values at the ablated surface. The standard test method for Vickers indentation hardness of advanced ceramics (ASTM C1327-99) was adopted. Microhardness was measured at the workpiece surface after the laser ablation process. The measurements were repeated five times at each location for the consistency of the results.

A linear micro-scratch tester (MCTX-S/N: 01-04300) was used to determine the friction coefficient of the laser ablate and as received surfaces. The equipment was set at the contact load of 0.03 N and end load of 5 N. The scanning speed was 5 mm min$^{-1}$ and loading rate was 5 N min$^{-1}$. The total length for the scratch test was 5 mm.

EXAMPLE 3

Surface Morphology and Hydrophobicity of Laser Ablated Surfaces

Figure 9:
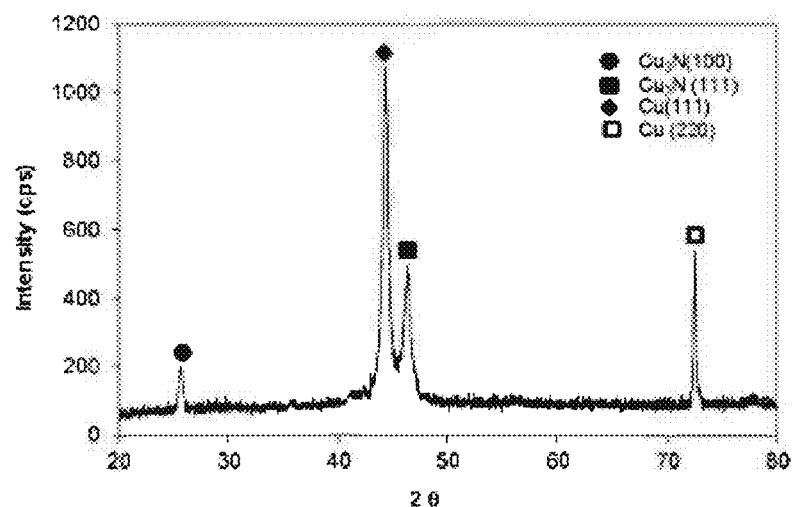
FIG. 9 is an X-ray diffraction (XRD) spectroscopy diffractogram of a laser ablated surface demonstrating the presence of $Cu_3N$.

FIG. 1, FIG. 2, FIG. 3, and FIG. 4 shows SEM micrographs of the laser ablated phosphor bronze surface. Laser ablation takes place during the irradiation of repetitive laser pulses along the laser scanning direction; in which case, the ablated surface forms regular laser scanning tracks. Since the laser pulse frequency is 1500 Hz and the laser scanning speed is 0.1 m s$^{-1}$, overlapping of irradiated spots occurs at the surface. The overlapping ratio is on the order of 70% at the surface. The laser intensity distribution is Gaussian and the pulse intensity remains high at the irradiated spot center. This, in turn, results in surface evaporation in the region limited to the irradiated spot center and the melting takes place in the remaining region or the irradiated spot. The melt flow towards the cavity center from its neighborhood modifies the cavity shape and reduces the cavity depth. Therefore, surface texture consisting of micro/nano poles and cavities results at the treated surface. This can also be seen in FIG. 5, FIG. 6, FIG. 7, and FIG. 8 in which the AFM data is shown for the laser treated surface. However, the close examination of the surface reveals that the surface appears mahogany with the presence of a few randomly scattered red spots, which are indications of copper. The mahogany color represents the presence of Cu$_3$N in the surface region, which is also observed from the X-ray diffractogram (FIG. 9). The presence of Cu$_3$N (100) is associated with the high nitrogen pressure incorporated in the laser treatment process. The presence of the few scattered copper spots is due to the dissolution of Cu$_3$N at elevated temperatures. In this case, in the near region of the cavity, the surface melts and solidifies rapidly because of the convection cooling of the nitrogen assisting gas; therefore, the dissolution of Cu$_3$N does not cover the whole surface. The laser treated surface is composed of sub-micron grains, which is attributed to the rapid solidification and formation of nitrides at the surface region.

In addition, the sub-micron size of the packed particles indicates that each particle contains many single crystals of Cu$_3$N as consistent with earlier work [G. H. Yue, P. X. Yan and J. Wang: 'Study on the preparation and properties of copper nitride thin films', J. Crystal Growth, 2005, 274, 464-468.—incorporated herein by reference in its entirety]. Although the use of assisting gas increase cooling rates at the surface, no micro-cracks are observed in between the packed grains.

The contact angle measurements are carried out to assess the hydrophobicity of the laser ablated surface. Since the laser ablated surface is chemically heterogeneous because of the local nitride formations and nitride dissolutions as the surface, the application of Young's equation is limited to ass the contact angle [M. Nosonovsky and B. Bhushan: 'Multiscale dissipative mechanisms and hierarchical surfaces: friction, superhydrophobicity, and biomimetics'; 2008, Heidelberg, Springer.—incorporated herein by reference in its entirety]. Wenzel and Cassie and Baxter proposed a relationship between the contact angle of a liquid droplet and the surface roughness factor to overcome this limitation [R. N. Wenzel: 'Resistance of solid surfaces to wetting by water', Industr. Eng. Chem., 1936, 28, 988-994.; and A. B. D. Cassie and S. Baxter: 'Wettability of porous surfaces', Trans. Faraday Soc., 1944, 40, 546-551.—each incorporated herein by reference in its entirety]. Wenzel's formulation [B. Bhushan: 'Biomimetics: bioinspired hierarchical-structured surfaces for green science and technology'; 2012, Heidelberg, Springer.—incorporated herein by reference in its entirety] takes the liquid penetration into account, and express the contact angles according to formula (I).

$$\cos\theta_w = \frac{r(\gamma_{sv} - \gamma_{sl})}{\gamma_{lv}} \quad (I)$$

In this equation, $\theta_w$ is the rough surface contact angle, $\gamma_{sv}$ is the interfacial tension of the solid/vapor interface, $\gamma_{sl}$ is the interfacial tension of the solid/liquid interface, $\gamma_{lv}$ is the interfacial tension of the liquid/vapor interface, and r is the surface roughness factor, which is defined as the ratio between the actual and projected surface areas, where r=1 for a perfectly smooth surface and r>1 for a rough surface. The contact angle equation is expressed as formula (II).

$$\cos\theta_c = f_1 \cos\theta_1 + f_2 \cos\theta_2 \quad (II):$$

In this equation, $\theta_c$ is the apparent contact angle, $f_1$ is the surface faction of the liquid/solid interface, $f_2$ is the surface fraction of the liquid/vapor interface, $\theta_1$ is the contact angle of the liquid/solid interface, and $\theta_2$ is the contact angle for the liquid/vapor interface. In the case of an air/liquid interface, $f_1$ is the solid/liquid fraction, and the air fraction ($f_2$) becomes (1−ft). For $f_1$=0, the liquid droplet is not in contact with the solid surface and for $f_1$=1, the droplet completely wets the surface.

Figure 10:
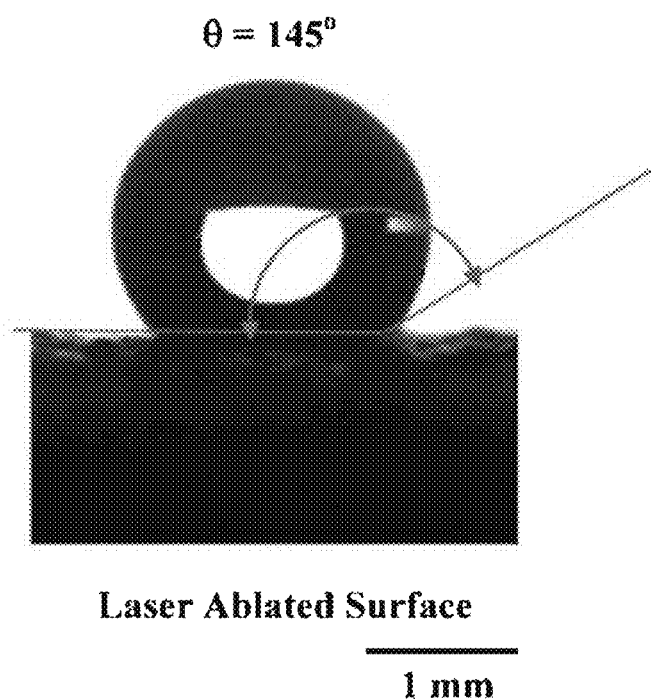
FIG. 10 is an optical microimage of a water droplet on a sample laser ablated metallic surface for contact angle measurements.
Figure 11:
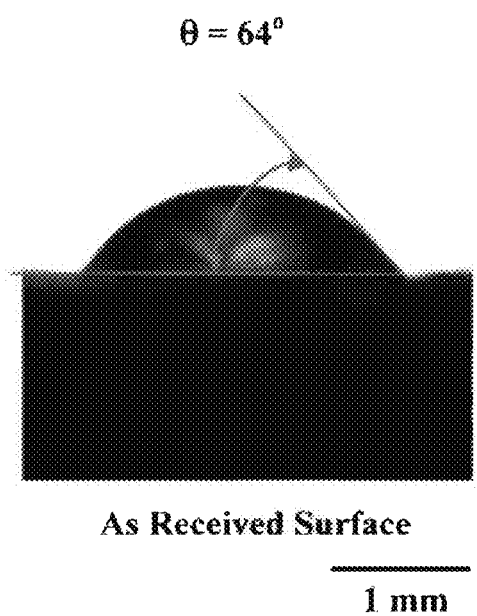
FIG. 11 is an optical microimage of a water droplet on a sample as received metallic surface for contact angle measurements.

FIG. 10 and FIG. 11 show optical images of the water droplet on the laser ablated and untreated surfaces while Table 2 provides the data on the contact angle measurements at different locations at the surfaces. The contact angle varies slightly with the location of the surface, which is attributed to the surface texture variation and the texture composition at the surface [H.-W. Zan, K.-H. Yen, P.-K. Liu, K.-H. Ku, C.-H. Chen and J. Hwang: 'Low-voltage organic thin film transistors with hydrophobic aluminum nitride film as gate insulator', Organic Electr., 2007, 8, 450-454.—incorporated herein by reference in its entirety]. In general, the laser treated surface demonstrates superhydrophobic behavior with the averaged contact angle of the surface being on the order of 142°. Consequently, the texture of the laser ablated surface, consisting of fine pillars and poles at a micro/nano scale, results in large contact angles for the water droplet.

TABLE 2

Contact angle measurement results at the surfaces of laser ablated and as received workpieces

| | Contact angle | |
|---|---|---|
| | Location 1 | Location 2 |
| Laser ablated surface | 148° (+5°/−5°) | 141° (+5°/−5°) |
| As received surface | 62° (+5°/−5°) | 63° (+5°/−5°) |

EXAMPLE 4

Metallurgical and Mechanical Properties of Laser Ablated Surfaces

Figure 12:
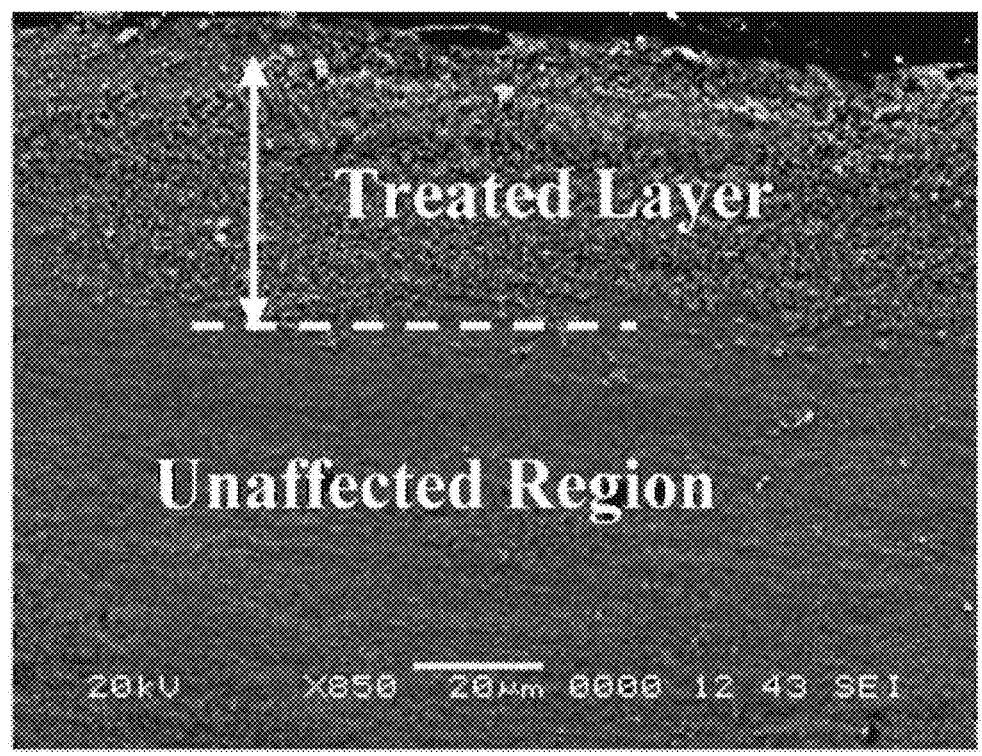
FIG. 12 is a SEM image of a cross-section of a laser ablated surface demonstrating a treated layer and an unaffected region.
Figure 13:
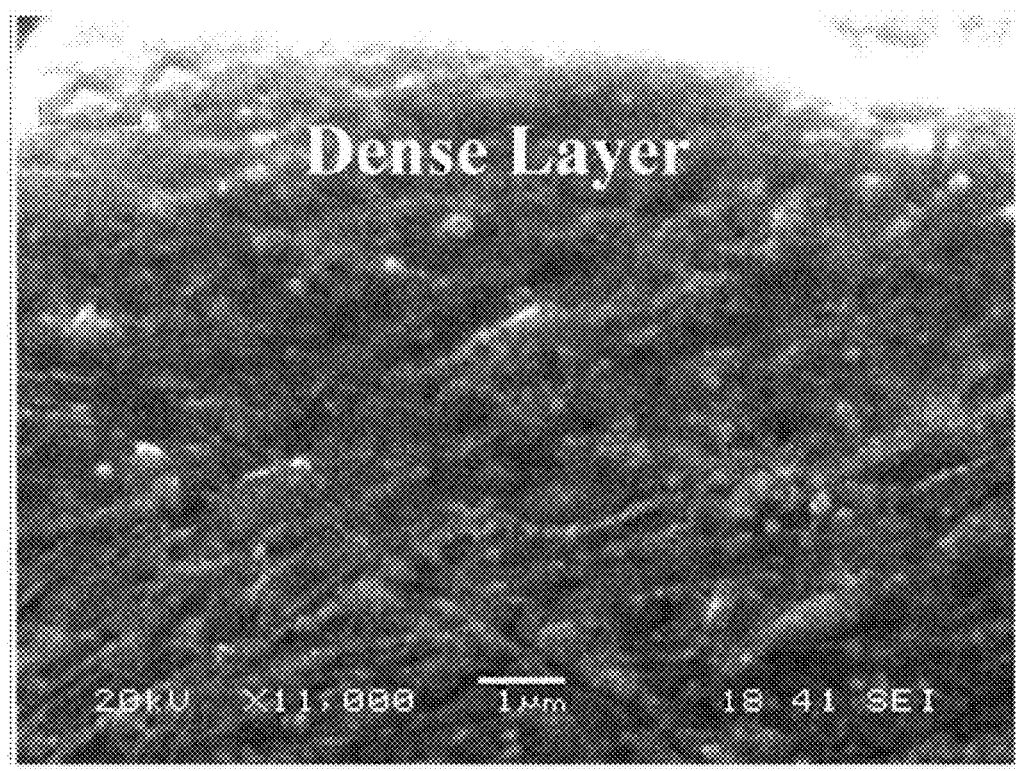
FIG. 13 is a SEM image of a cross-section of a laser ablated surface demonstrating a dense layer of small sized grains formed in the vicinity of the surface.
Figure 14:
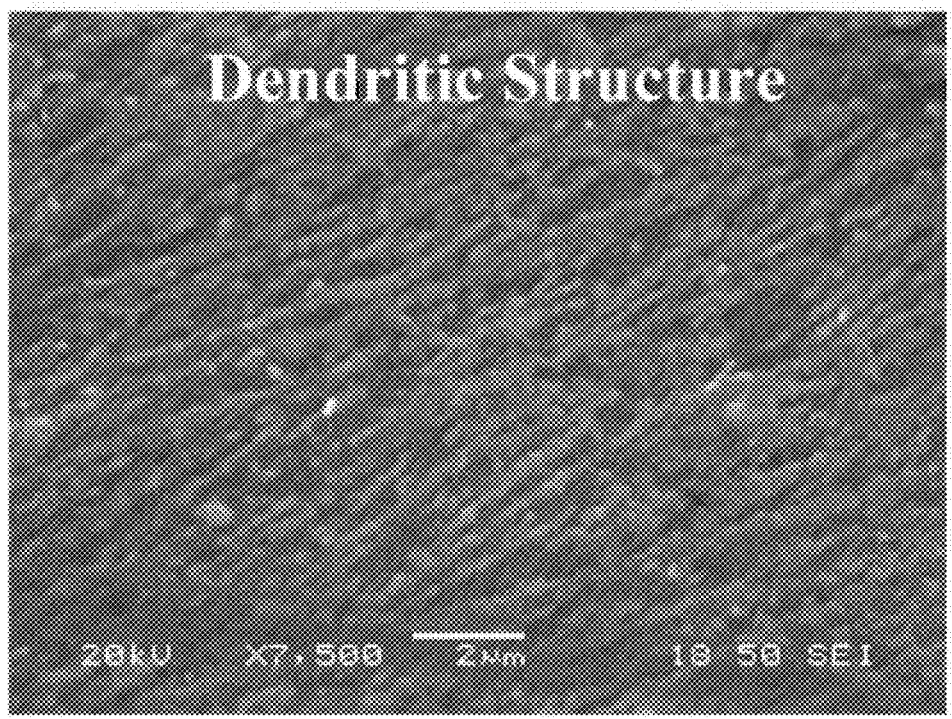
FIG. 14 is a SEM image of a cross-section of a laser ablated surface demonstrating a dendritic structure of elongated grains formed below the surface and below the dense layer.
Figure 15:
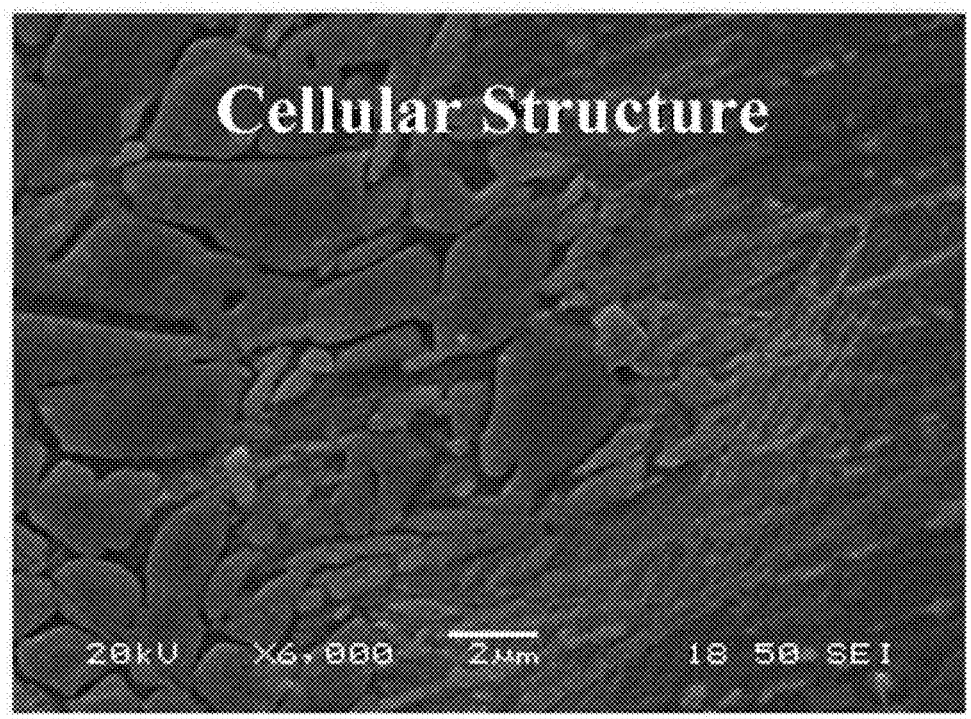
FIG. 15 is a SEM image of a cross-section of a laser ablated surface demonstrating a cellular structure below the surface, below the dense layer, and below the dendritic structure.
Figure 16:
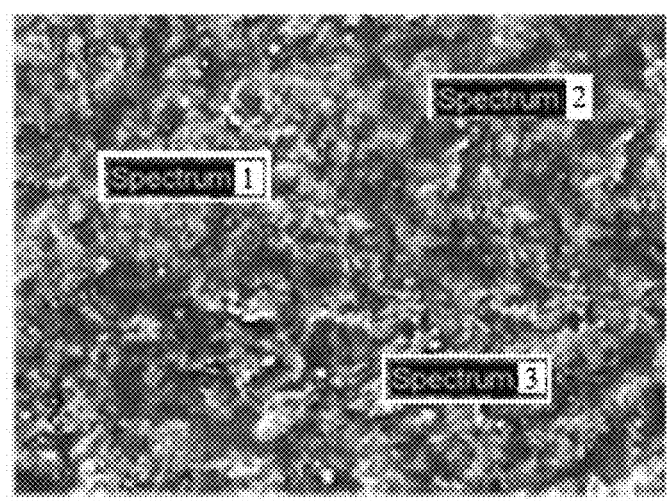
FIG. 16 is an image a sample laser ablated metallic surface demonstrating corresponding locations for different spectra taken for elemental composition analysis with energy-dispersive X-ray spectroscopy (EDS) of the laser ablated metallic surface.

FIG. 12 shows SEM micrographs of a cross-section of the laser ablated layer. A dense structure, consisting of submicron sized packed particles and extremely fine grains, is formed in the surface region (FIG. 13). Formation of $Cu_3N$ in the surface region lowers the density and causes volume shrinkage in the dense layer. In addition, the high quench rates in the cooling cycle after laser ablation are responsible for the formation of fine grains in the dense layer. A dendritic structure with elongated grains is observed at some distance below the dense layer (FIG. 14). The formation of a dendritic structure indicates the high rate of solidification in this region, the non-uniform cooling is responsible for the formation of the elongated grains. As the distance below the surface increases further, a cellular structure is formed (FIG. 15), which is associated with the relatively lower cooling rates as compared to that of the surface region. EDS data for the elemental composition of the laser treated surface is given in table 3 and corresponding sites are shown in FIG. 16. Although, quantification of the light elements in EDS data can involve some error, the presence of nitrogen is evident, and it has a high concentration at the surface. The reduced values of Sn and absence of P in some EDS spectrums indicates that Sn and/or P was evaporated in the surface region during the laser ablation process. The heat affected zone is shallow without forming a demarcation line between the heat affected zone and the base material, which is attributed to the high thermal conductivity of the bronze.

TABLE 3

EDS data corresponding to multiple locations at the laser treated surface

| Spectrum | N (wt %) | P (wt %) | Sn (wt %) | Cu (wt %) |
|---|---|---|---|---|
| Spectrum #1 | 7 | n/a | 5.7 | Balance |
| Spectrum #2 | 4 | 0.1 | 6 | Balance |
| Spectrum #3 | 6 | 0.1 | 5.8 | Balance |

*spectrum numbers correspond to locations shown in FIG. 16

The XRD technique was used to measure the residual stresses in the surface region of the laser ablated surface. The XRD technique provided data in the surface region of the specimens due to the low penetration depth of CuKα radiation into the treated layer, i.e. the penetration depth was on the order of a few μm. The magnitude of the shift in the diffraction peaks could be related to the magnitude of the residual stress. The relationship between the peak shift and the residual stress (a) is given as formula (III) [Z. A. Khan, M. Hadfield, S. Tobe and Y. Wang: 'Ceramic rolling elements with ring crack defects—a residual stress approach', Mater. Sci. Eng. A, 2005, 404, 221-226.—incorporated herein by reference in its entirety].

$$\sigma = \frac{E}{(1+\upsilon)\sin^2\psi} \frac{(d_n - d_0)}{d_0} \tag{III}$$

In this equation, E is the Young's modulus, u is Poisson's ratio, w is the tilt angle, and $d_n$ are the d spacing measured at each tilt angle. If shear strains are not present in the specimen, the d spacing changes linearly with $\sin^2 \psi$. $d_0$ is the inter-planer spacing when substrate is free from stresses. The calculation were performed for $Cu_3N(100)$ planes (2θ=23.44°) with an inter-planer spacing of 0.3844 nm. It should be noted that Cu3N is identified in accordance with the International Centre for Diffraction Data (ICDD 00-055-0308 card). The linear dependence of d(100) results in a slope of $-1.9 \times 10^{-3} \pm 9.12 \times 10^{-5}$ nm and an intercept of $0.3844 \pm 4.75 \times 10^{-3}$ nm. The elastic modulus and Poisson's ratio of phosphor bronze are 96.5 GPa and 0.34 respectively [Young Modulus of Elasticity for Metals and Alloys & Coefficients of Linear Expansion: http://www.engineeringtoolbox.com/youngmodulus-d_773. html; www.engineeringtoolbox.com/linear-expansion-coefficients-d95. html, 2014.—incorporated herein by reference in its entirety]. The residual stress measured is on the order of −350 MPa, which is compressive, and the estimated error is ±10 MPa, which is 2.4%. It should be noted that the error is estimated based on three independent repeats of the XRD measurements.

The microhardness and residual stress data for the laser ablated surface are given in Table 4. The microhardness of the laser ablated surface is high (580±30 HV), which is almost four times the hardness of the base material (145±10 HV) and this may be due to one or all of the following: (i) the dense structure formed in the surface region and/or (ii) the formation of $Cu_3N$ compounds in the surface region after the laser ablation process. The residual stress measured by the XRD technique is of the order of −350±10 MPa. Since ablation takes place along the laser scanning tracks, lately ablated regions create a self-annealing effect on the previously ablated regions. This in turn modifies the cooling rates, particularly, below the surface. However, the self-annealing effect created during the cooling period does not significantly alter the stress levels in the surface vicinity because of the convective cooling of the assisting gas at the surface; therefore, the residual stress remains high in the surface region. It should be noted that the residual stress measured is limited to the surface vicinity, since the penetration depth of the X-ray radiation is on the order of a few

TABLE 4

Microhardness and residual stress measurement results at surfaces of laser ablated and as received workpieces

| | Hardness (HV) | Residual stress (MPa) |
|---|---|---|
| Laser ablated surface | 580 (+30/−30) | −350 (+10/−10) |
| As received surface | 140 (+10/−10) | n/a |

Figure 17:
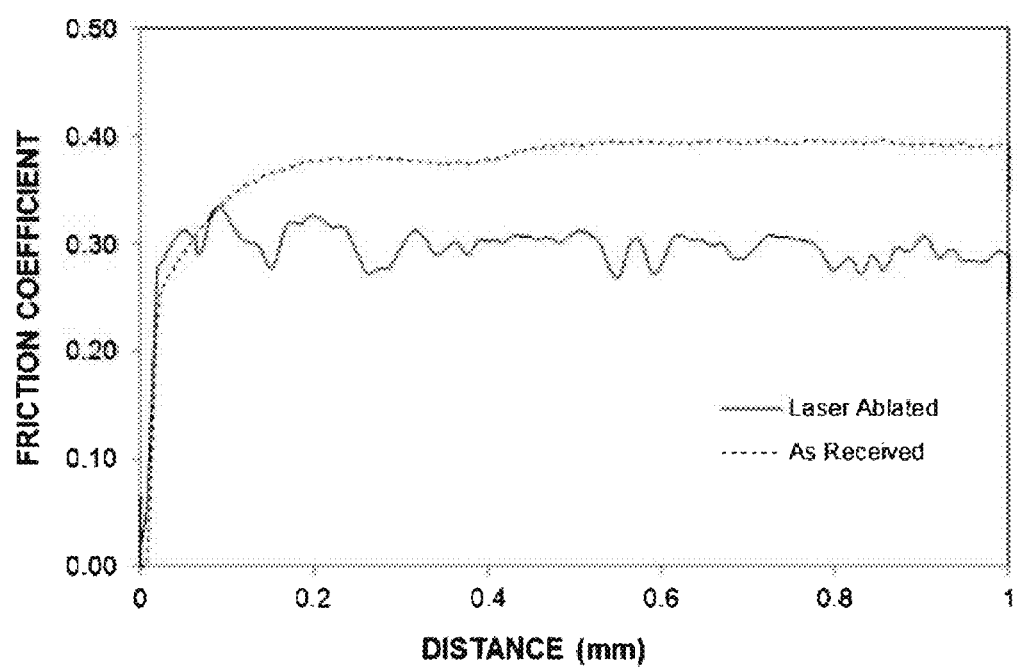
FIG. 17 illustrates the results of a scratch test used to determine the friction coefficient of a laser ablated metallic surface sample and an as received metallic surface sample.

Although the workpiece surface expands freely during the laser ablation process, the surface vicinity is not free to expand and compressive stresses are formed. This behavior is responsible for the attainment of high residual stress in the surface region. FIG. 17 shows the scratch test results used to determine the friction coefficient of the laser ablated and as received surfaces. The friction coefficient of the laser ablated surface is lower than that corresponding to the as received workpiece. This is, mainly, associated with the microhardness enhancement at the laser ablated surface because of the dense layer formation in the surface region under the high cooling rates and formation of $Cu_3N$ at the surface due to high pressure nitrogen assisting gas. It should be noted that no pealing and delamination of the surface is observed during and after such scratch tests.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of treating a metallic surface comprising a copper alloy, comprising:
    ablating the metallic surface by directing a laser beam with a diameter of 100-400 µm produced by a $CO_2$ laser with a pulse frequency of 1200-1800 Hz onto the metallic surface; and
    concurrently exposing the metallic surface to a $N_2$ assist gas with a pressure of 550-650 KPa to form an ablated metallic surface comprising microgrooves with $Cu_3N$ present on a surface of the microgrooves;
    wherein the $N_2$ assist gas and the laser beam are oriented coaxially; and
    wherein the ablated metallic surface has a higher surface hydrophobicity than the metallic surface prior to the ablating.

2. The method of claim 1, wherein the copper alloy is phosphor bronze.

3. The method of claim 1, wherein the metallic surface is ablated with a laser beam having a power in the range of 1.5-2.5 kW.

4. The method of claim 1, wherein the metallic surface is ablated with a laser beam with a scanning speed in the range of 0.05-0.15 m·s$^{-1}$.

5. The method of claim 1, wherein the ablating and concurrently exposing is performed such that laser scanning tracks are formed on the metallic surface and the overlapping ratio of the laser scanning tracks is in the range of 60-80% at the metallic surface.

6. The method of claim 1, wherein the metallic surface is ablated with a laser beam to a penetration depth in the range of 1-10 µm.

7. The method of claim 1, wherein the microgrooves have an average width in the range of 40-60 µm and an average distance between the microgrooves is in the range of 20-30 µm.

8. The method of claim 1, wherein the ablated metallic surface has a surface roughness in the range of 0.05-0.8 µm when measured on a 4 µm by 4 µm area.

9. The method of claim 1, wherein the ablated metallic surface has an average water droplet contact angle in the range of 120-160°.

10. The method of claim 1, wherein the surface hydrophobicity as measured by an average water droplet contact angle of the ablated metallic surface is increased by at least 100% relative to a substantially similar metallic surface that is not treated by the ablating and the concurrently exposing.

11. The method of claim 1, wherein the ablated metallic surface has a Vickers hardness in the range of 3-8 GPa.

12. The method of claim 1, wherein a Vickers hardness of the ablated metallic surface is increased by at least 200% relative to a substantially similar metallic surface that is not treated by the ablating and the concurrently exposing.

13. The method of claim 1, wherein a coefficient of friction of the ablated metallic surface is less than a coefficient of friction of a substantially similar metallic surface that is not treated by the ablating and the concurrently exposing.

14. The method of claim 1, wherein a fracture toughness of the ablated metallic surface is increased in the range of 10-20% relative to a substantially similar metallic surface that is not treated by the ablating and the concurrently exposing.

15. The method of claim 1, wherein the ablated metallic surface has a residual stress that is compressive and in the range of −100 to −500 MPa.

16. The method of claim 1, wherein the metallic surface is not pretreated with hard particles, a film, a resin, nanostructures or any combination thereof prior to the ablating.

17. The method of claim 1, further comprising coating the ablated metallic surface with a hydrophobic layer to form a super hydrophobic metallic surface.

18. The method of claim 17, wherein the hydrophobic layer comprises at least one selected from the group consisting of a fluorocarbon, a perfluorocarbon, a resin, a hydrophobic fatty acid, and a hydrophobic self-assembled monolayer.

19. A method of treating a phosphor bronze surface, comprising:
    ablating the phosphor bronze surface by directing a laser beam with a diameter of 100-400 µm produced by a $CO_2$ laser with a pulse frequency of 1200-1800 Hz onto the phosphor bronze surface; and
    concurrently exposing the phosphor bronze surface to a $N_2$ assist gas with a pressure of 550-650 KPa to form an ablated phosphor bronze surface comprising microgrooves with $Cu_3N$ present on a surface of the microgrooves;
    wherein the $N_2$ assist gas and the laser beam are oriented coaxially; and
    wherein the ablated phosphor bronze surface has a surface hydrophobicity that is at least 100% higher than a substantially similar phosphor bronze surface that is not treated by the ablating and the concurrently exposing as measured by an average water droplet contact angle.

20. A product comprising a phosphor bronze surface having microgrooves with $Cu_3N$ present on a surface of the microgrooves and an average water droplet contact angle in the range of 120-160°.

* * * * *